(12) United States Patent
Hwang et al.

(10) Patent No.: US 11,943,530 B2
(45) Date of Patent: Mar. 26, 2024

(54) ELECTRONIC DEVICE AND METHOD FOR ADJUSTING CAMERA MAGNIFICATION

(71) Applicant: Samsung Electronics Co., Ltd., Gyeonggi-do (KR)

(72) Inventors: Taehee Hwang, Gyeonggi-do (KR); Hankyung Jeon, Gyeonggi-do (KR); Joonil Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 60 days.

(21) Appl. No.: 17/038,829

(22) Filed: Sep. 30, 2020

(65) Prior Publication Data

US 2021/0112206 A1    Apr. 15, 2021

(30) Foreign Application Priority Data

Oct. 10, 2019    (KR) ........................ 10-2019-0125395

(51) Int. Cl.
*H04N 23/63* (2023.01)
*G06F 3/0485* (2022.01)
*H04N 23/69* (2023.01)
*G06F 3/0488* (2022.01)

(52) U.S. Cl.
CPC ......... *H04N 23/631* (2023.01); *G06F 3/0485* (2013.01); *H04N 23/69* (2023.01); *G06F 3/0488* (2013.01)

(58) Field of Classification Search
CPC .......... H04N 5/232933; H04N 5/23296; G06F 3/0485; G06F 3/0488; G06F 3/04845
See application file for complete search history.

(56) References Cited

U.S. PATENT DOCUMENTS

| | | | | |
|---|---|---|---|---|
| 9,716,825 | B1* | 7/2017 | Manzari | H04N 5/23222 |
| 10,001,808 | B1* | 6/2018 | Quinn | G06F 1/1635 |
| 10,645,294 | B1* | 5/2020 | Manzari | H04N 5/232945 |
| 2010/0283730 | A1* | 11/2010 | Miyazaki | H04N 21/42204 |
| | | | | 345/158 |
| 2012/0044169 | A1* | 2/2012 | Enami | H04N 1/00413 |
| | | | | 345/173 |
| 2013/0055119 | A1* | 2/2013 | Luong | H04N 5/232127 |
| | | | | 715/764 |
| 2015/0350525 | A1* | 12/2015 | Sudo | H04N 5/232939 |
| | | | | 348/240.2 |
| 2016/0241793 | A1* | 8/2016 | Ravirala | H04N 5/2258 |

(Continued)

*Primary Examiner* — Michael Roswell
(74) *Attorney, Agent, or Firm* — The Farrell Law Firm, P.C.

(57) ABSTRACT

An electronic device includes a display, at least one camera, a memory, and a processor operatively connected to the display, the plurality of cameras, and the memory. The memory stores instructions causing the processor, upon executing the instructions, to identify a camera magnification of the at least one camera in response to an execution of a camera application of the electronic device, to receive a first user input for adjusting the camera magnification, to display a user interface (UI) for adjusting the camera magnification in response to receiving the first user input, to calculate a scroll speed on the displayed UI by using an acceleration factor corresponding to the received first user input or a second user input in a section allocated to the identified camera magnification, and to adjust the camera magnification by using the calculated scroll speed.

14 Claims, 23 Drawing Sheets

(56) References Cited

U.S. PATENT DOCUMENTS

2017/0123497 A1* 5/2017 Yonezawa ........ H04N 5/232127
2017/0359504 A1   12/2017 Manzari et al.
2020/0084390 A1*  3/2020 Sato ................. H04N 5/23216

* cited by examiner

ELECTRONIC DEVICE AND METHOD FOR ADJUSTING CAMERA MAGNIFICATION

CROSS-REFERENCE TO RELATED APPLICATION(S)

This application is based on and claims priority under 35 U.S.C. § 119 to Korean Patent Application No. 10-2019-0125395, filed on Oct. 10, 2019, in the Korean Intellectual Property Office, the entire disclosure of which is incorporated herein by reference.

BACKGROUND

1. Field

The disclosure relates generally to an electronic device and a method for adjusting a camera magnification.

2. Description of Related Art

A portable electronic devices (hereinafter referred to as an "electronic device") such as smart phones may be equipped with various functions. An electronic device may include a touch-sensitive display (i.e., touch screen) through which a user may easily access such functions, and may provide screens of various applications through the display.

In addition, the electronic device may include one or more cameras. The electronic device having the one or more cameras may adjust the magnification of the one or more cameras to shoot with various angles of view and/or distances.

The electronic device may provide a user interface (UI) for adjusting the magnification of the one or more cameras.

As the performance of cameras is developed, the one or more cameras of the electronic device may be allowed to adjust the magnification thereof up to a high magnification. However, when the camera magnification is adjusted for shooting in electronic devices, it may be difficult to quickly and accurately adjust the magnification to the user's satisfaction.

SUMMARY

The present disclosure has been made to address the above-mentioned problems and disadvantages, and to provide at least the advantages described below.

In accordance with an aspect of the present disclosure, An electronic device includes a display, at least one camera, a memory, and a processor operatively connected to the display, the plurality of cameras, and the memory. The memory stores instructions causing the processor, upon executing the instructions, to identify a camera magnification of the at least one camera in response to an execution of a camera application of the electronic device, to receive a first user input for adjusting the camera magnification, to display a UI for adjusting the camera magnification in response to receiving the first user input, to calculate a scroll speed on the displayed UI by using an acceleration factor corresponding to the received first user input or a second user input in a section allocated to the identified camera.

In accordance with another aspect of the present disclosure, a method for adjusting a camera magnification in an electronic device includes identifying a camera magnification of at least one camera included in the electronic device in response to an execution of a camera application of the electronic device, receiving a first user input for adjusting the camera magnification, displaying a UI for adjusting the camera magnification in response to receiving the first user input, calculating a scroll speed on the displayed UI by using an acceleration factor corresponding to the received first user input or a second user input in a section allocated to the identified camera magnification, and adjusting the camera magnification by using the calculated scroll speed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, embodiments of the disclosure will be described in detail with reference to the accompanying drawings.

The electronic device and method according to various embodiments of the disclosure can provide a zoom in/out speed to meet a user's intention by setting various sections corresponding to at least one camera.

Figure 1:
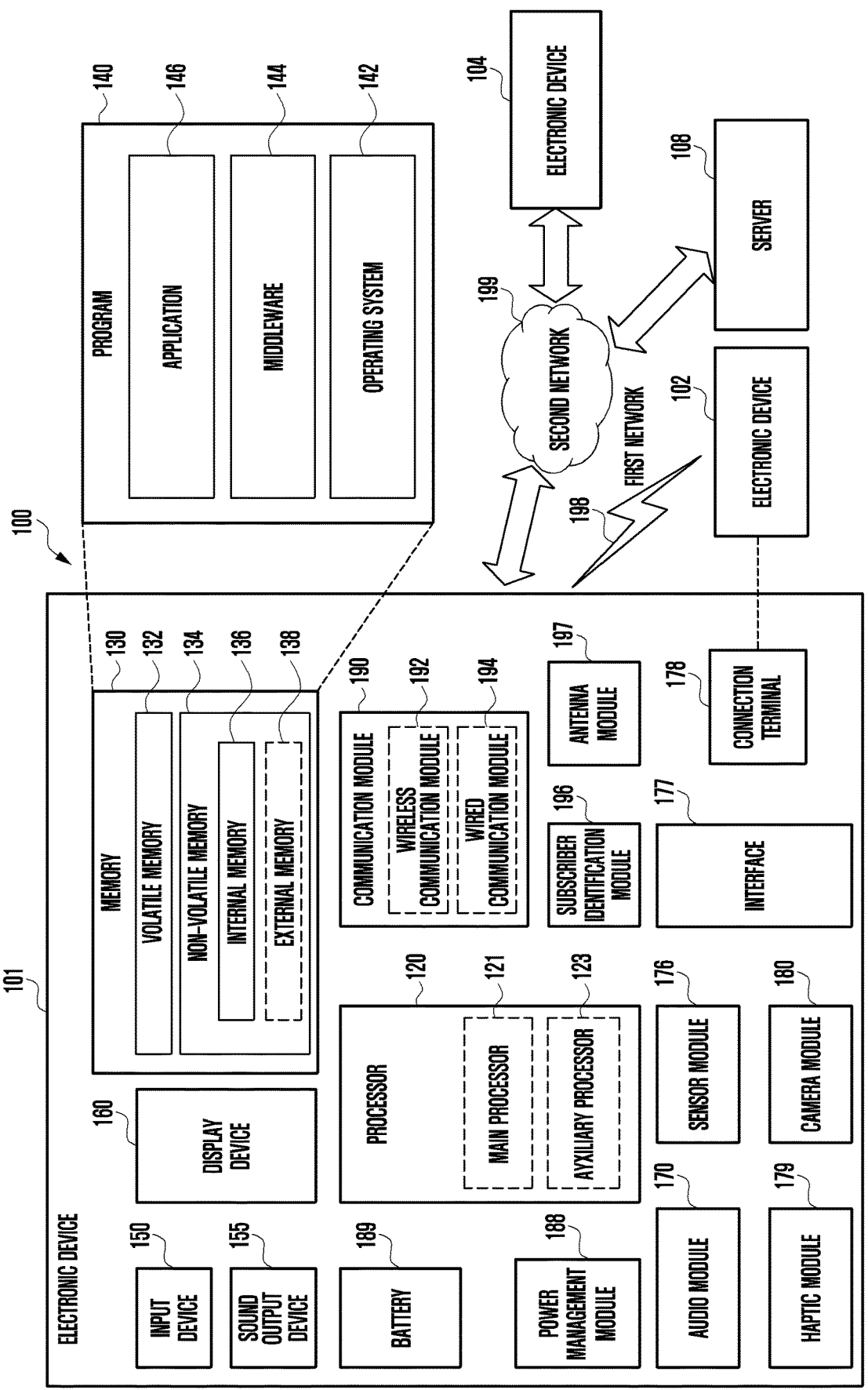
FIG. 1 illustrates an electronic device in a network environment, according to an embodiment.

FIG. 1 illustrates an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
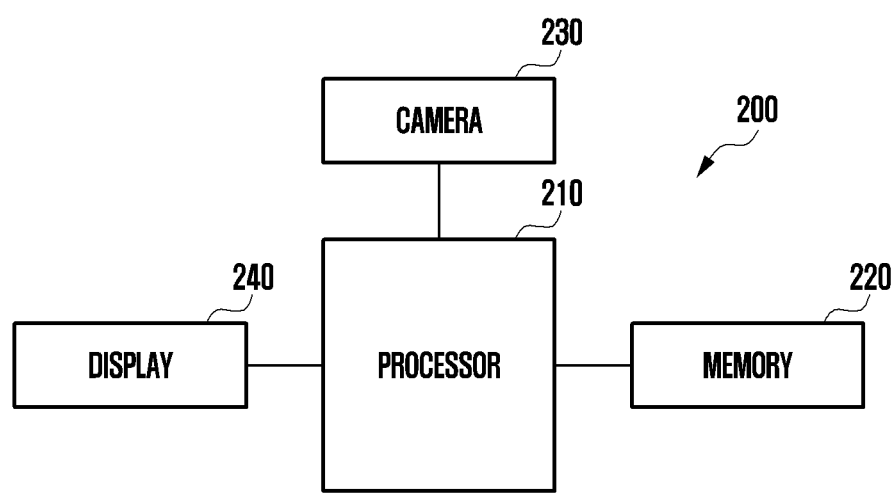
FIG. 2 illustrates an electronic device including a camera, according to an embodiment.

FIG. 2 illustrates an electronic device including a camera according to an embodiment.

Referring to FIG. 2, the electronic device 200 (e.g., the electronic device 101 in FIG. 1) includes a processor 210 (e.g., the processor 120 in FIG. 1), a memory 220 (e.g., the memory 130 in FIG. 1), at least one camera 230 (e.g., the camera module 180 in FIG. 1), and a display 240 (e.g., the display device 160 in FIG. 1). The above-listed components of the electronic device are exemplary only. The electronic device according to various embodiments may further include any component for performing a particular function, or may not include one or more of the above-listed components. The electronic device according to various embodiments may include at least some of the configuration and/or functions of the electronic device 101 shown in FIG. 1.

The processor 210 may perform various instructions to adjust a camera magnification. When a first user input is detected from the display 240, the processor 210 may control to display, on at least a portion of the display 240, a zoom bar UI for adjusting the camera magnification. Controlling the electronic device 200 through the processor 210 executing various instructions will be described throughout this disclosure.

The processor 210 is a component capable of controlling the respective components of the electronic device 200 and processing various data. The processor 210 may include at least some of the configuration and/or functions of the processor 120 shown in FIG. 1. The processor 210 may be functionally, operatively, and/or electrically connected to components of the electronic device 200, including the memory 220, the at least one camera 230, and the display 240.

The memory 220 may store various software programs (or applications, application programs, etc.), data, and instructions for the operation of the electronic device 200. At least some of such programs may be downloaded from external servers through wireless or wired communication. The instructions may be defined by, for example, but not limited to, a camera application, or may be defined by a framework, a hardware abstraction layer, or an operating system. The memory 220 may include at least some of the configuration and/or functions of the memory 130 shown in FIG. 1.

The memory 220 may store instructions that cause the processor 210, upon executing the instructions, to identify a current camera magnification in response to an execution of a camera application of the electronic device 200, to receive a first user input for adjusting the camera magnification (or utilizing a camera zoom function), and to display a UI for adjusting the camera magnification in response to receiving the first user input. In addition, the instructions may cause the processor 210 to calculate a scroll speed on the displayed UI by using an acceleration factor corresponding to the received first user input or a second user input in a section allocated to the identified camera magnification, and to adjust the camera magnification by using the calculated scroll speed.

The electronic device 200 may include the at least one camera 230, for example, a first camera, a second camera, a third camera, and/or the like. The respective cameras may have different angles of view. The first camera may be ultra-wide, the second camera may be wide, and the third camera may be a tele-camera. This is, however, exemplary only and not to be considered as a limitation. Alternatively, each camera may have any other angle of view and thus be named differently. The electronic device 200 may acquire an image using any one of the cameras 230 at a specific magnification and display it on the display 240.

The camera 230 may be composed of various essential or optional sub-components. The camera 230 may include at least some of the configuration and/or functions of the camera module 180 shown in FIG. 1.

The display 240 may display a variety of information, data, and/or contents under the control of the processor 210. The display 240 may include at least some of the configuration and/or functions of the display device 160 illustrated in FIG. 1.

The display 240 may be a touch-sensitive display based on a touch panel or a touch screen. The display 240 may include a touch sensor, which may be implemented in any one of various manners including an in-cell manner and an on-cell manner. In addition, the display 240 may detect various types of user input entered thereon. For example, the display 240 may detect a user's direct touch input through the touch sensor, and/or detect a user's indirect touch input using a stylus pen, a touch pencil, a bluetooth low energy pencil (BLE pen), etc.

Figure 3:
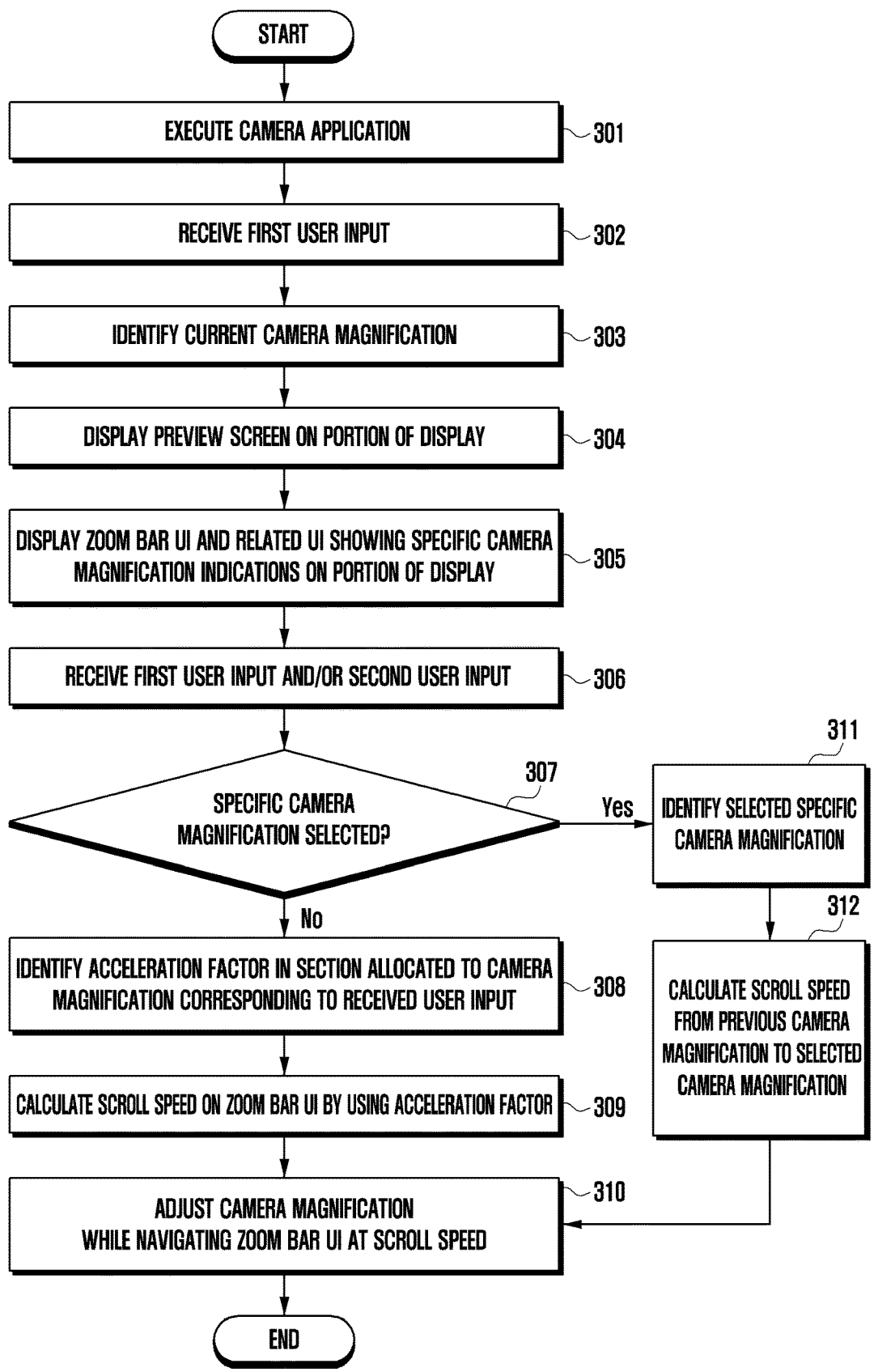
FIG. 3 is a flow diagram illustrating a method for adjusting a camera magnification of an electronic device, according to an embodiment.

FIG. 3 is a flow diagram illustrating a method for adjusting a camera magnification of an electronic device, according to an embodiment. In FIG. 3, respective operations corresponding to respective blocks depicted in the flow diagram may be performed sequentially, but this is not necessary. For example, the order of such operations may be changed at least in part, and at least two operations may be performed in parallel or concurrently. In addition, at least one operation may be omitted if necessary.

The electronic device (e.g., the electronic device 101 in FIG. 1 or the electronic device 200 in FIG. 2) may execute a camera application at a user's request to start shooting. At step 301, the processor executes (e.g., the processor 120 in FIG. 1 or the processor 210 in FIG. 2) may recognize the execution of the camera application of the electronic device.

At step 302, the processor receives a first user input from the display (e.g., the touch screen) or a button (e.g., a hardware button for volume control) equipped on the electronic device. The first input, received by the processor at the step 302, may include an input of selecting a camera (e.g., the camera module 180 in FIG. 1 or the camera 220 in FIG. 2) or a shooting mode, an input of clicking a volume-up button, an input of clicking a volume-down button, a pinch-in input, a pinch-out input, and/or an input (e.g., a gesture input) using the BLE pen.

The instructions stored in the memory may cause the processor to display a preview screen on a portion of the display at step 304 when the first user input received at step 302 is a hold input for selecting a camera, a click input of a volume-up/down button, or a pinch-in/out input. The above types of the first user input for displaying the preview screen are exemplary only and not to be considered as a limitation. Any other type of the first user input for displaying the preview screen may be defined and used.

At step 303, the instructions stored in the memory cause the processor to identify a current camera magnification. The identified camera magnification will be used at step 309 for calculating a scroll speed for a section allocated for each camera.

At step 304, the instructions stored in the memory cause the processor to display the preview screen on a portion of the display as described above. The preview screen offers a real-time image to assist shooting. Normally, the preview screen may occupy the entire area of or a selected portion of the display.

At step 305, the instructions stored in the memory cause the processor to display, on a portion of the display, a zoom bar UI for adjusting the camera magnification and a related UI showing specific camera magnification indications. At the step 305, the above-mentioned UIs may be overlaid partially on the preview screen being previously displayed. Alternatively, the above UIs may be displayed outside the preview screen.

The zoom bar UI displayed at step 305 may be implemented, for example, in the form of a gradation bar. Any form of the zoom bar UI is possible such as a form according to a user setting, a form offered by or selected in related software, and/or a default form provided by a manufacturer of the electronic device.

The related UI showing specific camera magnification indications displayed at step 305 may be implemented, for example, so as not to be overlapped with the zoom bar UI. This UI may be set to show a plurality of specific camera magnifications, for example, five camera magnifications. The instructions stored in the memory may cause the processor to selectively show default camera magnifications or frequently used camera magnifications in the related UI. The specific camera magnification indications may be a 0.5 magnification, a 1.0 magnification, a 2.0 magnification, a 4.0 magnification, and an 8.0 magnification. This is exemplary only and may be varied depending on the performance or types of cameras equipped in the electronic device. The zoom bar UI may show only a part of the entire range of camera magnifications that the electronic device can provide. In addition, a currently displayed range of the zoom bar UI may be changed after the camera magnification is adjusted in response to the first user input or in response to a second user input to be described later.

At step 306, the instructions stored in the memory cause the processor to receive the first user input or the second user input. The first user input received at the step 306 may include an input of performing a scroll or navigation through the zoom bar UI simultaneously with displaying the zoom bar UI. For example, at step 306, the processor receives, as the first user input, an input of clicking a volume-up button, an input of clicking a volume-down button, a pinch-in input, a pinch-out input, or an input using the BLE pen. The volume-related inputs and the pinch-related inputs may be regarded as the second user input as well as the first user input, so that the processor may perform steps 302 and 306 simultaneously.

At step 307, the instructions stored in the memory cause the processor to determine whether the received user input is a selection of a specific camera magnification in the related UI. If the previously received first user input relates to camera magnification adjustment, the processor may determine, at step 307, whether the second user input is to select a specific camera magnification in the related UI. If the previously received first user input relates to the volume-related input or the pinch-related input, the processor may determine, at step 307, that the received user input is not a selection of a specific camera magnification in the related UI. In this case, the processor may perform a scroll or navigation through the zoom bar UI, based on the received second or first user input.

When it is determined at step 307 that the received user input is a selection of a specific camera magnification in the related UI, the instructions cause the processor to identify the selected specific camera magnification at step 311.

When it is determined at step 307 that the received user input is not a selection of a specific camera magnification in the related UI, the instructions cause the processor to perform step 308.

At step 308, the instructions stored in the memory cause the processor to identify an acceleration factor in a section allocated to the camera magnification corresponding to the received first or second user input. Such sections allocated to the respective camera magnifications and related acceleration factors will be described below with reference to FIG. 4.

At step 309, the instructions stored in the memory cause the processor to calculate a scroll speed on the zoom bar UI by using the acceleration factor identified at step 308. In this disclosure, a scroll or scrolling on the zoom bar UI may also be referred to as a navigation or navigating. The acceleration factor is defined as an amount of change in camera magnification with respect to the size (e.g., the speed of a touch or button input, or the distance of a drag input) of the user input (e.g., the first user input or the second user input). For example, when different acceleration factors are used in response to a specific user input, scroll speeds on the zoom bar UI may be different.

At step 310, the instructions stored in the memory cause the processor to adjust the camera magnification while navigating the zoom bar UI by using the scroll speed calculated at step 309.

At step operation 311, the instructions stored in the memory cause the processor to identify the specific camera magnification selected through the second user input.

At step 312, the instructions stored in the memory cause the processor to calculate a scroll speed on the zoom bar UI from the current camera magnification identified at step 303 to the selected camera magnification identified at step 311.

The calculating process of step 312 may follow the calculating process of steps 308 and 309. Additionally or alternatively, the calculating process may be set to perform rapid navigating at the maximum speed by the greatest factor among the acceleration factors in the allocated section for each camera magnification.

Figure 4:
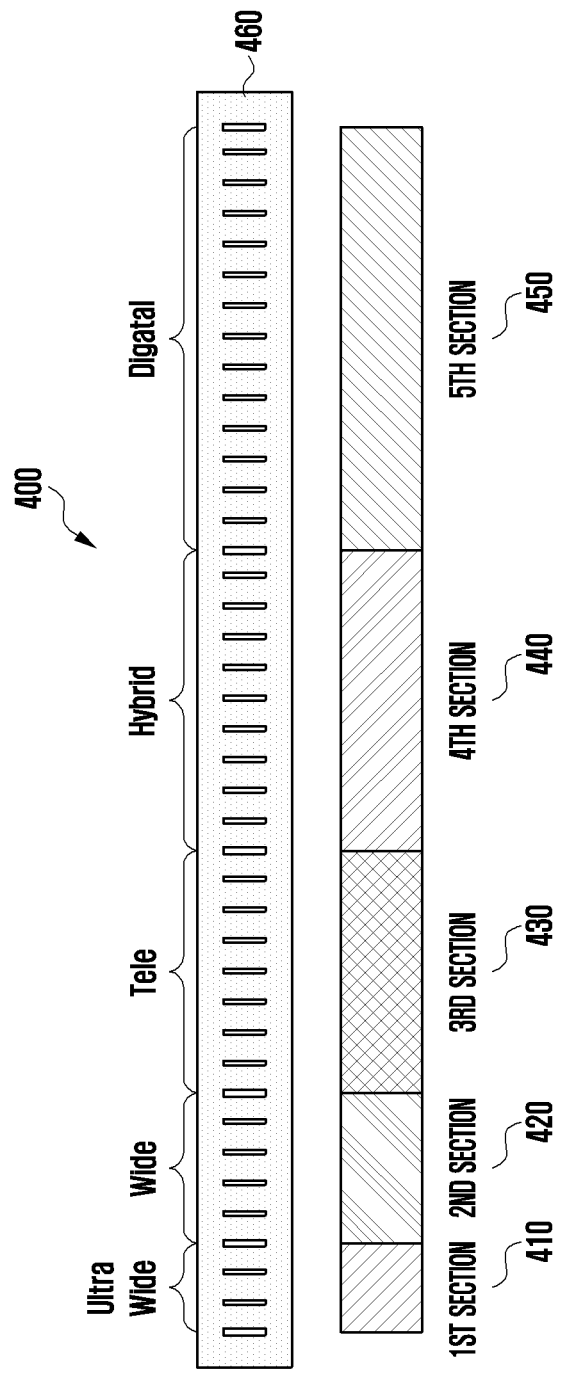
FIG. 4 illustrates a zoom bar UI and sections allocated to magnifications of at least one camera of an electronic device, according to an embodiment.

FIG. 4 illustrates a zoom bar UI and sections allocated to magnifications of at least one camera of an electronic device, according to an embodiment.

The plurality of cameras (e.g., the camera module 180 in FIG. 1 or the camera 230 in FIG. 2) of the electronic device (e.g., the electronic device 101 in FIG. 1 or the electronic device 200 in FIG. 2) may have different magnification-adjustable sections. The plurality of cameras may have different functions and/or different performances depending on their uses, so that sections in which camera magnification can be adjusted may be different.

The plurality of cameras may include a first camera, a second camera, and a third camera. This is, however, exemplary only. The plurality of cameras equipped in the electronic device may be increased, if necessary, up to the nth camera ("n" means an arbitrary natural number).

The first camera may be an ultra-wide camera, the second camera may be a wide camera, and the third camera may be a tele-camera. The first camera may have a wider viewing angle than the second camera, and the second camera may have a wider viewing angle than the third camera. The electronic device may utilize the first camera at a lower magnification than the second camera, and may utilize the second camera at a lower magnification than the third camera. In other words, the electronic device may capture an image using any one of the plurality of cameras in accordance with a camera magnification set by the user (or a default camera magnification).

The memory (e.g., the memory 130 in FIG. 1, or the memory 220 in FIG. 2) of the electronic device may store data for sections 400 divided and allocated to a plurality of camera magnifications. The allocated sections may be set to provide convenience when navigating through the zoom bar UI 460 for adjusting the camera magnification, and may be set for efficient magnification adjustment between a low magnification and a high magnification different scroll speeds (or navigating speeds) for the respective sections.

The sections divided and allocated to the camera magnifications may be a first section 410, a second section 420, a third section 430, a fourth section 440, and a fifth section 450. This is, however, exemplary only, and the number of the sections may be extended to be equal to or greater than the number of cameras equipped in the electronic device. At least some of sections (e.g., the third section 430, the fourth section 440, and the fifth section 450) may be set to capture an image by the same camera.

The allocated sections for the camera magnifications may be set to allocate a magnification adjustment range of the first camera to the first section, allocate a magnification adjustment range of the second camera to the second section, and allocate a magnification adjustment range of the third camera to the third section. The fourth section may be set to allocate a magnification adjustment range using the third camera and a magnification adjustment function of the camera application together. The fifth section may be set to allocate a magnification adjustment range up to the maximum magnification adjustment range (i.e., a limit value of the magnification adjustment) of the electronic device together with the third camera. Although the allocated sections for the camera magnifications are illustrated by expressing the low magnification section as a low number and the high magnification section as a high number, this is exemplary only. Alternatively, the allocated sections may be expressed by letters, expressed in the reverse order, or expressed in any other manner.

The types of the first user input that can be received by the processor (e.g., the processor 120 in FIG. 1 or the processor 210 in FIG. 2) may be set, customized, or changed in a user setting, in the camera application, and/or by a manufacturer of the electronic device. The first user input may include an input of selecting a camera (or a shooting mode) from among the plurality of cameras, an input of clicking a volume-up button, an input of clicking a volume-down button, a pinch-in input, a pinch-out input, and/or an input using the BLE pen.

The processor may receive, at step 305 in FIG. 3, the first user input as an input for displaying the zoom bar UI. The input for displaying the zoom bar UI at step 305 may be the first user input of selecting one of the plurality of cameras. In addition, this input may be a touch input (e.g., a tab input or a touch-and-hold input for a certain time) on a desired camera icon. The processor does not adjust the camera magnification immediately upon receiving the first user input (i.e., the touch input) for selecting the camera, but displays the zoom bar UI for camera magnification adjustment.

The types of the second user input that can be received by the processor may be set, customized, or changed in a user setting, in the camera application, and/or by a manufacturer of the electronic device. The second user input may include an input of clicking a volume-up button, an input of clicking a volume-down button, a pinch-in input, a pinch-out input, a swipe input, a long press input on the zoom bar UI, a touch on a specific camera magnification indication in the separately displayed UI, and/or an input using the BLE pen.

When any one of an input of clicking a volume-up button, an input of clicking a volume-down button, a pinch-in input, a pinch-out input, or an input using the BLE pen is received as the first user input, the processor may regard this input as the second user input as well as the first user input. That is, from among the above-listed types of the first user input, the input of selecting a camera may be regarded as an input for displaying the zoom bar UI (i.e., step 305 in FIG. 3) before adjusting the camera magnification. In contrast, the volume-up/down button click input, the pinch-in/out input, and/or the BLE pen input may be regarded as an input for displaying the zoom bar UI and simultaneously adjusting the camera magnification.

When the allocated section is changed from an n1 section to an n2 section during the camera magnification adjustment, the processor may select an n2 camera used in the n2 section to acquire an image. For example, when the first camera is used to acquire an image in the first section and then the camera magnification is changed to the second section in response to the first or second user input, the processor may change the used camera to the second camera to acquire an image in the second section.

The processor may acquire an image using the first camera in the first section, acquire an image using the second camera in the second section, and acquire an image using the third camera in the third section.

Referring to FIG. 4, the fourth section 440 may be referred to as a hybrid, which is set to use a magnification adjustment function of the camera application together with the third camera. In addition, the fifth section 450 may be referred to as digital, which is set to use a digital zoom of the electronic device together with the third camera. The digital zoom is to obtain a zoom effect by enlarging a partial screen of image data for shooting through digital processing (e.g., cropping). The digital zoom may be utilized as a supplementary means of optical zoom, and is available using software without any change in hardware of the electronic device.

The sections allocated to the camera magnifications or cameras in the zoom bar UI are exemplary only and not to be considered as a limitation. The sections may be set, customized, or changed in a user setting, in the camera application, and/or by a manufacturer of the electronic device.

The sections allocated to the camera magnifications may be displayed in the form of gradations on the zoom bar UI. However, the allocated sections may not be one-to-one matching with the actual camera magnifications, and the navigating speeds on the camera magnifications may be different for the sections.

In the zoom bar UI, the gradations may have the same interval. However, a difference in the camera magnification indicated by the gradation interval may be varied depending on the allocated sections. That is, the camera magnification corresponding to one gradation may be set differently for each section for efficient display of the zoom bar UI. For example, if the first section is allocated to the first camera capable of adjusting the camera magnification from 0.25 to 0.5, and if the second section is allocated to the second camera capable of adjusting the camera magnification from 0.5 to 2.0, the number of gradations on the zoom bar UI may be set differently for the first section and the second section. Differently setting the size of the camera magnification corresponding to one gradation may provide convenience for adjusting the camera magnification. This example for the first and second sections may be similarly applied to all of the sections. This may be set, customized, or changed in a user setting, in the camera application, and/or by a manufacturer of the electronic device.

The length of the section allocated to each camera magnification may be set as "the length per section"="the number of gradations"×"the pixels of gradation interval". This may be set or customized when the electronic device is initially provided, when the software is updated, and/or by the user.

The first, second, third, fourth, and fifth sections may be allocated to camera magnifications of 0.25 to 0.5, 0.5 to 1.0, 1.0 to 2.0, 2.0 to 4.0, and 4.0 to 8.0, respectively. As described above, the camera magnification indicated by the gradation may be different depending on the allocated sections. For example, if a user input moving by "d" in the nth section is received, it may be set to move along gradations by "m" (e.g., "n" denotes 1, 2, 3, 4, 5, etc., and "m" denotes 3, 5, 8, 10, 15, etc.). The length of the nth section is varied depending on the number "n", and thus the number "m" may be set to increase in proportion to the length of the corresponding section. This may be set or customized when the electronic device is initially provided, when the software is updated, and/or by the user.

The processor may receive a result of detecting the first or second user input as one of classified speeds such as slow, normal, fast, and very fast speeds. The memory may store related instructions. The above classified speeds of input are, however, exemplary only and may be differently set more than or less than four.

In connection with the steps 308 and 309 in FIG. 3, the speeds of the first or second user input may be defined as a slow speed less than 100 dp/s, a normal speed between 100 dp/s and 200 dp/s, a fast speed between 200 dp/s and 400 dp/s, and a very fast speed of 400 dp/s or more. The dp/s is dots per inch (dpi) per second which means the touched dpi by the user on the display per second. A high dp/s could may mean that the scroll speed is fast. This definition is, however, exemplary only and may be set, customized, or changed in a user setting, in the camera application, and/or by a manufacturer of the electronic device.

The instructions stored in the memory may cause the processor to calculate a scroll speed on the zoom bar UI for adjusting the camera magnification by using an acceleration factor of the section allocated to the camera magnification. The processor may use the acceleration factor designated for each user input speed in the section. In one embodiment, the acceleration factors of the first, second, and third sections may be set to 0.5 for a slow user input, 0.5 to 1.0 for a normal user input, 1.0 to 1.5 for a fast user input, and 2.0 for a very fast user input. The acceleration factors of the fourth and fifth sections may be set to 0.5 for a slow user input, 0.5 to 1.0 for a normal user input, 1.0 to 1.5 for a fast user input, and 3.0 for a very fast user input. These acceleration factors are, however, exemplary only and may be set, customized, or changed in a user setting, in the camera application, and/or by a manufacturer of the electronic device.

The scroll speed for adjusting the camera magnification (calculation of the scroll distance) may be calculated using "the scroll distance"="the distance of a user input"×"the acceleration factor". That is, the processor may calculate the scroll distance from both the received user input and the acceleration factor and then regard (or convert) the calculated scroll distance as (or into) the scroll speed because it is assumed that the calculated scroll distance is obtained by scrolling for the same period of time. In addition, "the distance of a user input" may be defined as a pinch in/out distance, a drag distance of swipe, a distance corresponding to a click speed or time of the volume control button, a distance corresponding to a input speed (or gesture speed) using the BLE pen, a distance corresponding to a long press time, and the like. This definition between the user input distance and the user input type may be implemented with a separate table and may be set, customized, or changed in a user setting, in the camera application, and/or by a manufacturer of the electronic device.

The instructions stored in the memory may cause the processor to adjust the camera magnification at step 310 in FIG. 3 by using the calculation result obtained through step 309 or 312 in FIG. 3.

In order to calculate the scroll speed on the zoom bar UI (or calculating the navigating speed or the scroll distance), the processor may apply the acceleration factor designated for each section allocated to each camera magnification. The acceleration factor for each section may be set differently depending on the speed of the first or second user input (e.g., slow, normal, fast, or very fast) stored in the memory.

Calculating the scroll speed (or navigating speed) on the zoom bar UI may be the same as or similar to calculating the scroll distance (or navigating distance). This is because adjusting the camera magnification on the zoom bar UI is made by scrolling (or navigating) through the gradations on the zoom bar UI. In addition, a scrolling process on the zoom bar UI is performed through continuous actions along the sections allocated to the camera magnifications, but the scroll speed may be calculated as a discrete value.

Figure 5A:
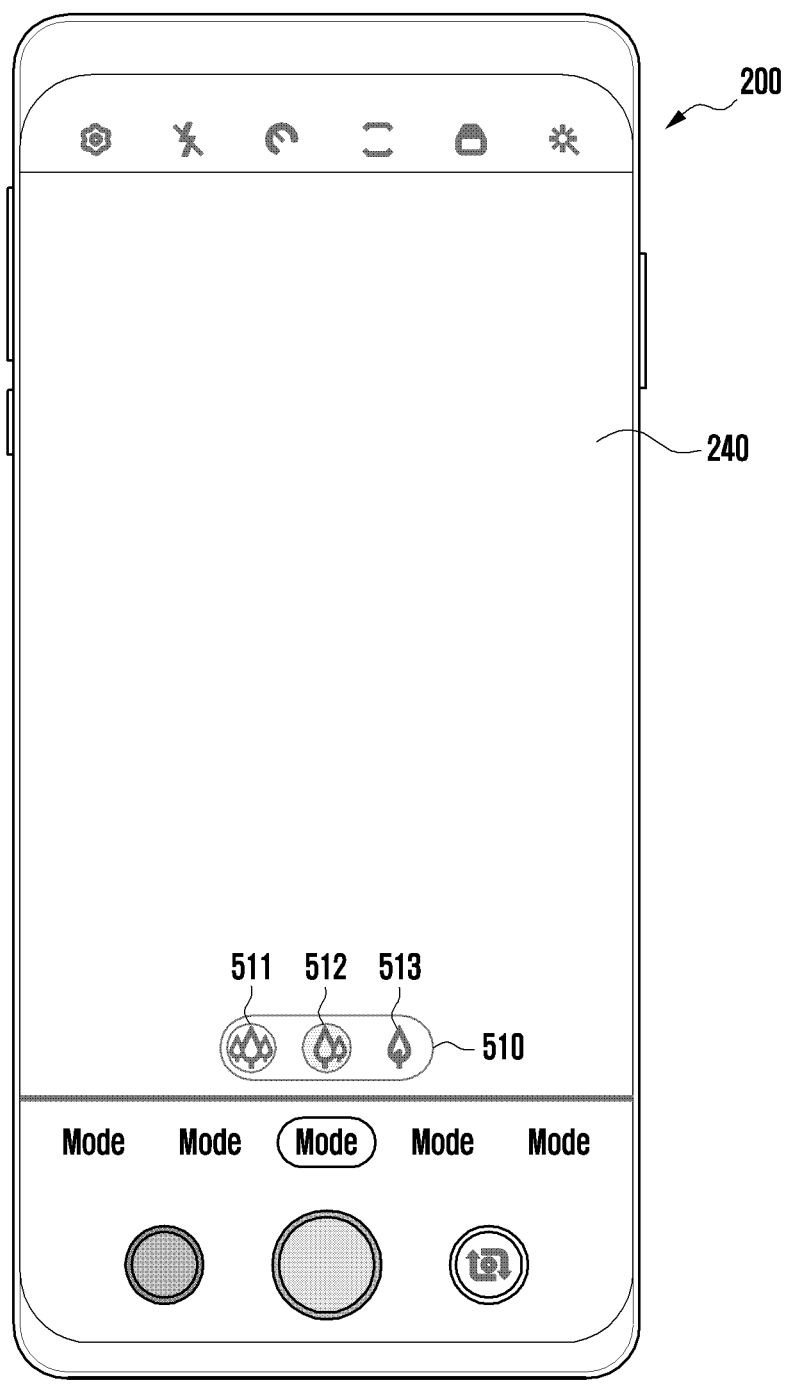
FIG. 5A illustrates a screen receiving a first user input for displaying a zoom bar UI in an electronic device, according to an embodiment.

FIG. 5A illustrates a screen of receiving a first user input for displaying a zoom bar UI in an electronic device, according to an embodiment.

The instructions stored in the memory (e.g., the memory 130 in FIG. 1 or the memory 220 in FIG. 2) may cause the processor (e.g., the processor 120 in FIG. 1 or the processor 210 in FIG. 2) to receive a first user input of selecting one of the plurality of cameras (e.g., the camera module 180 in FIG. 1 or the camera 230 in FIG. 2) (or selecting a shooting mode). Referring to FIG. 5A, a UI 510 containing threes camera icons 511, 512, and 513 is displayed, and the first user input may select one of the camera icons 511, 512, and 513. The number of camera icons contained in the UI 510 is exemplary only, and may be varied depending on the cameras equipped in the electronic device.

In the UI 510 that contains three camera icons 511, 512, and 513, the first user input may be an input of selecting the first camera icon 511, selecting the second camera icon 512, or selecting the third camera icon 513. In response to the first user input, the processor may select one of three cameras equipped therein.

As illustrated in FIG. 5A, the screen displayed on the display (e.g., the display device 160 in FIG. 1 or the display 240 in FIG. 2) may be a default screen offered when the camera application is executed. The default screen may contain, for example, a shooting button, a front/rear camera switching icon, a preview screen, a setting icon related to a shooting function, the UT 510 indicating the plurality of camera icons, and the like.

The instructions stored in the memory may cause the processor to switch the default screen to a screen of displaying the zoom bar UI 460 in response to receiving, as the first user input, a touch-and-hold input of selecting one of the camera icons displayed on the default screen. In this case, an elapsed time of the touch-and-hold input for switching to the zoom bar UI display screen may be settable or changeable.

Figure 5B:
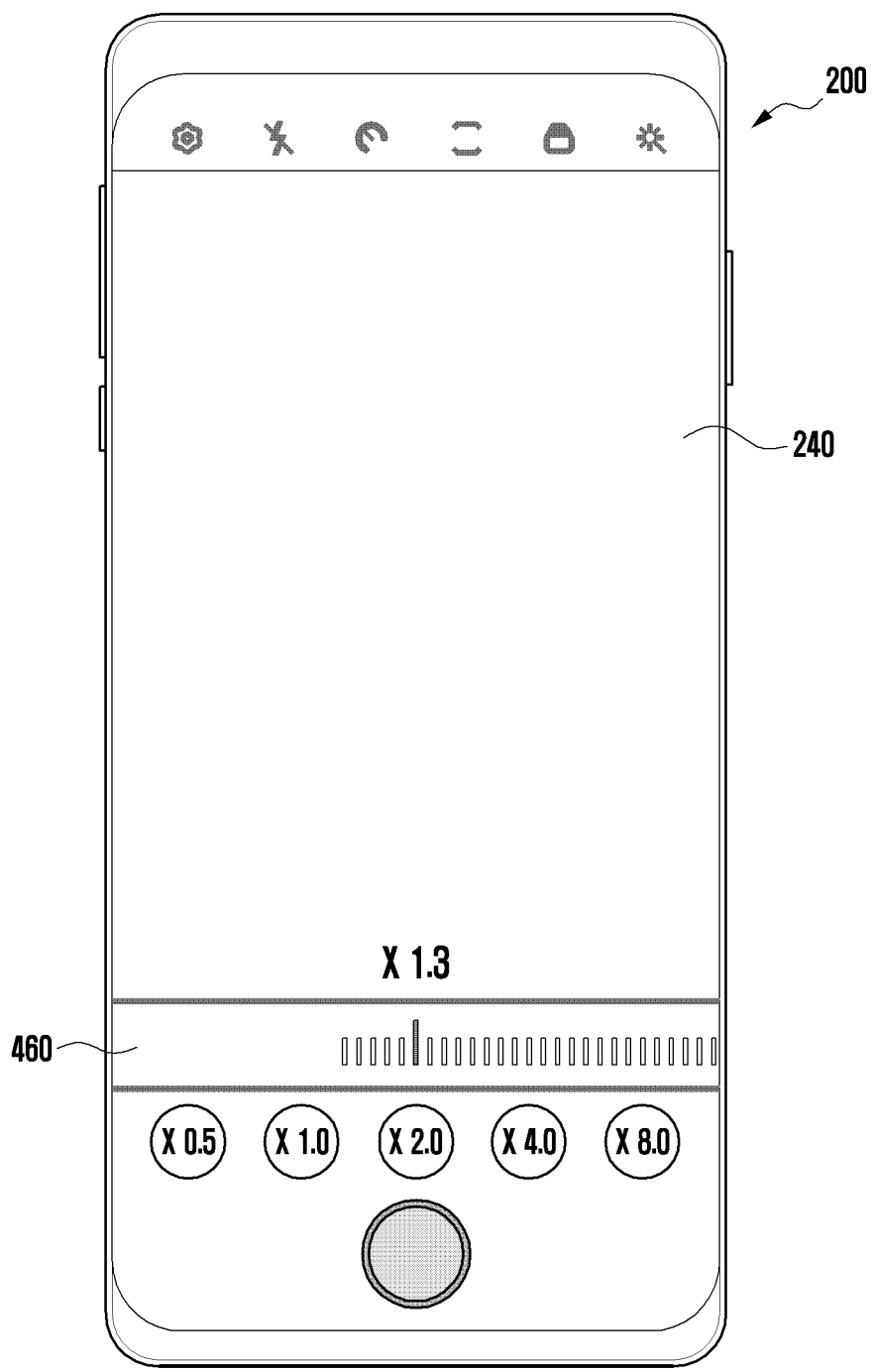
FIG. 5B illustrates a screen related to camera magnification adjustment including displaying a zoom bar UI in an electronic device, according to an embodiment.

FIG. 5B illustrates a screen related to camera magnification adjustment including displaying a zoom bar UI in an electronic device, according to an embodiment.

In response to receiving the first user input on the default screen as shown in FIG. 5A, the processor may switch the default screen to a screen as shown in FIG. 5B. The screen in FIG. 5B may contain the zoom bar UI 460, instead of the UI 510 in FIG. 5A, and a related UI showing specific camera magnification indications (e.g., 0.5 magnification, 1.0 magnification, 2.0 magnification, 4.0 magnification, and 8.0 magnification). The processor may display a current camera magnification, identified at step 303 in FIG. 3, above the zoom bar UI. Entry to the FIG. 5B screen from the FIG. 5A screen is to merely display the zoom bar UI 460 without accompanying camera magnification adjustment. Thus, zooming in/out does not occur yet.

The instructions stored in the memory may cause the processor to return to the default screen of FIG. 5A when any user input is not received for a certain time (e.g., 2 seconds) in a state where the screen of FIG. 5B is displayed. The above time for returning to the default screen of FIG. 5A may restart whenever any user input is entered during the camera magnification adjustment.

Figure 6A:
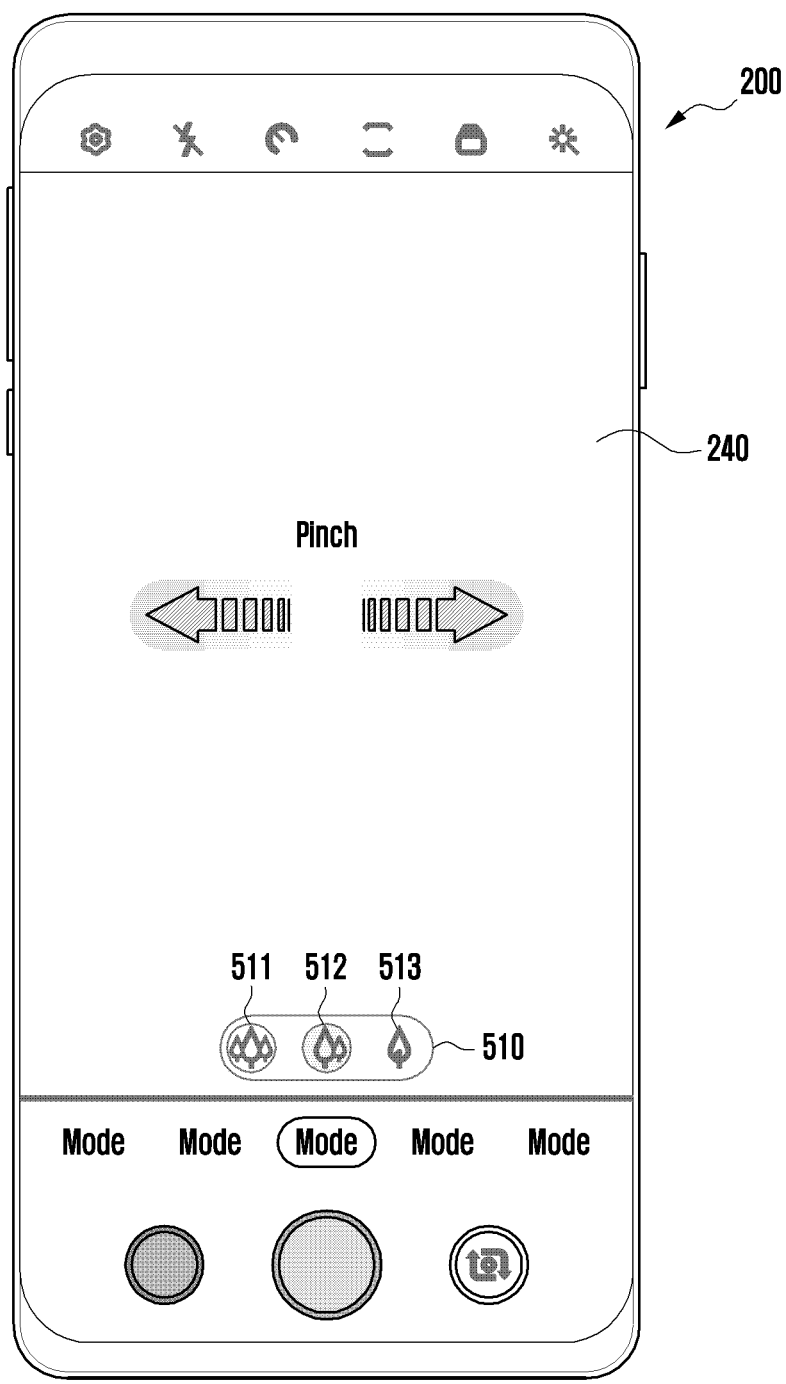
FIG. 6A illustrates a screen of receiving a first user input for displaying a zoom bar UI in an electronic device, according to an embodiment.

FIG. 6A illustrates a screen of receiving a first user input for displaying a zoom bar UI in an electronic device, according to an embodiment.

The instructions stored in the memory (e.g., the memory 130 in FIG. 1 or the memory 220 in FIG. 2) may cause the processor (e.g., the processor 120 in FIG. 1 or the processor 210 in FIG. 2) to receive, as the first user input, a pinch-in or pinch-out input. Referring to FIG. 6A, the first user input is the pinch-out input on the preview screen contained in the default screen displayed on the display (e.g., the display device 160 in FIG. 1 or the display 240 in FIG. 2). The pinch-in input may also be received as the first user input.

Figure 6B:
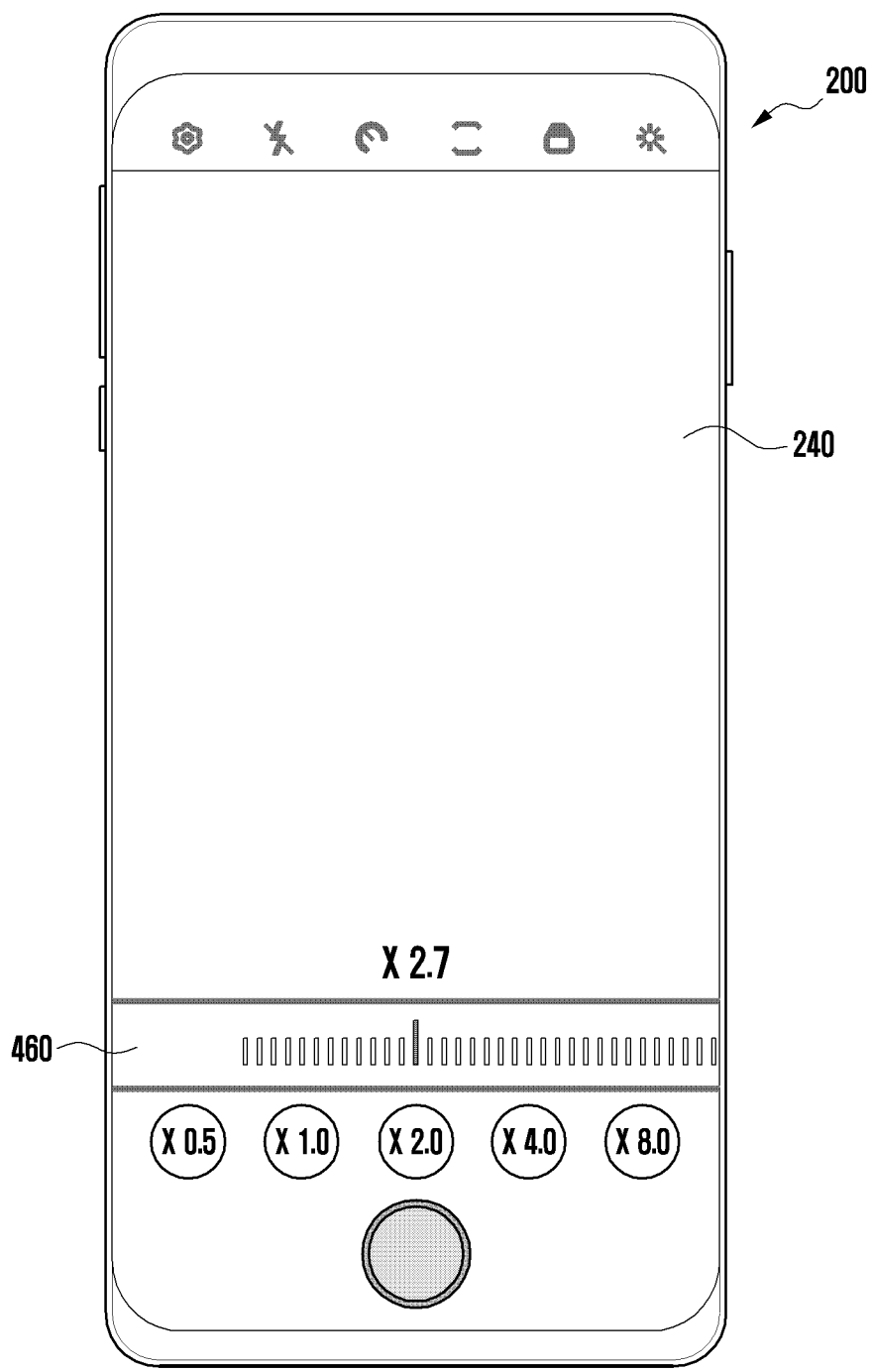
FIG. 6B illustrates a screen related to camera magnification adjustment including displaying a zoom bar UI in an electronic device, according to an embodiment.

In response to receiving the pinch-in or pinch-out input on the default screen shown in FIG. 6A, the processor of the electronic device (e.g., the electronic device 101 in FIG. 1 or the electronic device 200 in FIG. 2) may switch the default screen to a screen as shown in FIG. 6B. If the first user input is the pinch-out input, the processor may perform zoom-in to adjust the camera magnification to a higher camera magnification than the current camera magnification identified at step 303 in FIG. 3. In contrast, if the first user input is the pinch-in input, the processor may perform zoom-out.

FIG. 6B illustrates a screen related to camera magnification adjustment including displaying a zoom bar UI in an electronic device, according to an embodiment.

In response to receiving the first user input on the default screen as shown in FIG. 6A, the processor may switch the default screen to a screen as shown in FIG. 6B. The screen in FIG. 6B may contain the zoom bar UI 460, instead of the UI 510 in FIG. 6A, and a related UI showing specific camera magnification indications. Contrary to the first user input of FIG. 5A, the first user input (i.e., pinch-in/out input) of FIG. 6A accompanies camera magnification adjustment. Thus, the processor may perform zoom-in/out simultaneously with switching the screen in response to receiving the first user input. For example, if the current camera magnification identified at step 303 in FIG. 3 is 1.0, and if the first user input received in FIG. 6A is the pinch-out input, the processor may perform zoom-in at a scroll speed corresponding to the received input while simultaneously switching the screen from FIG. 6A to FIG. 6B.

Instead of the pinch-in/out input, an input of clicking the volume button may be entered as the first user input. Specifically, an input of clicking the volume-down button may be set to replace the pinch-in input, and an input of clicking the volume-up button may be set to replace the pinch-out input. The above-described zoom-in/out process may be performed simultaneously even in case of the volume button input.

In addition, an input using the BLE pen may also be used instead of the pinch-in/out input. For example, a gesture input of pressing the BLE pen on the screen and rotating the BLE pen clockwise may replace the pinch-out input. Similarly, a gesture input of pressing the BLE pen on the screen and rotating the BLE pen counter-clockwise may replace the pinch-in input. This gesture input using the BLE pen may be set, customized, or changed in a user setting, in the camera application, and/or by a manufacturer of the electronic device. The above-described zoom-in/out process may be performed simultaneously even in case of the gesture input using the BLE pen.

The instructions stored in the memory may cause the processor to return to the default screen of FIG. 6A when any user input is not received for a certain time (e.g., 2 seconds) in a state where the screen of FIG. 6B is displayed. The above time for returning to the default screen of FIG. 6A may restart whenever any user input is entered during the camera magnification adjustment.

Figure 7A:
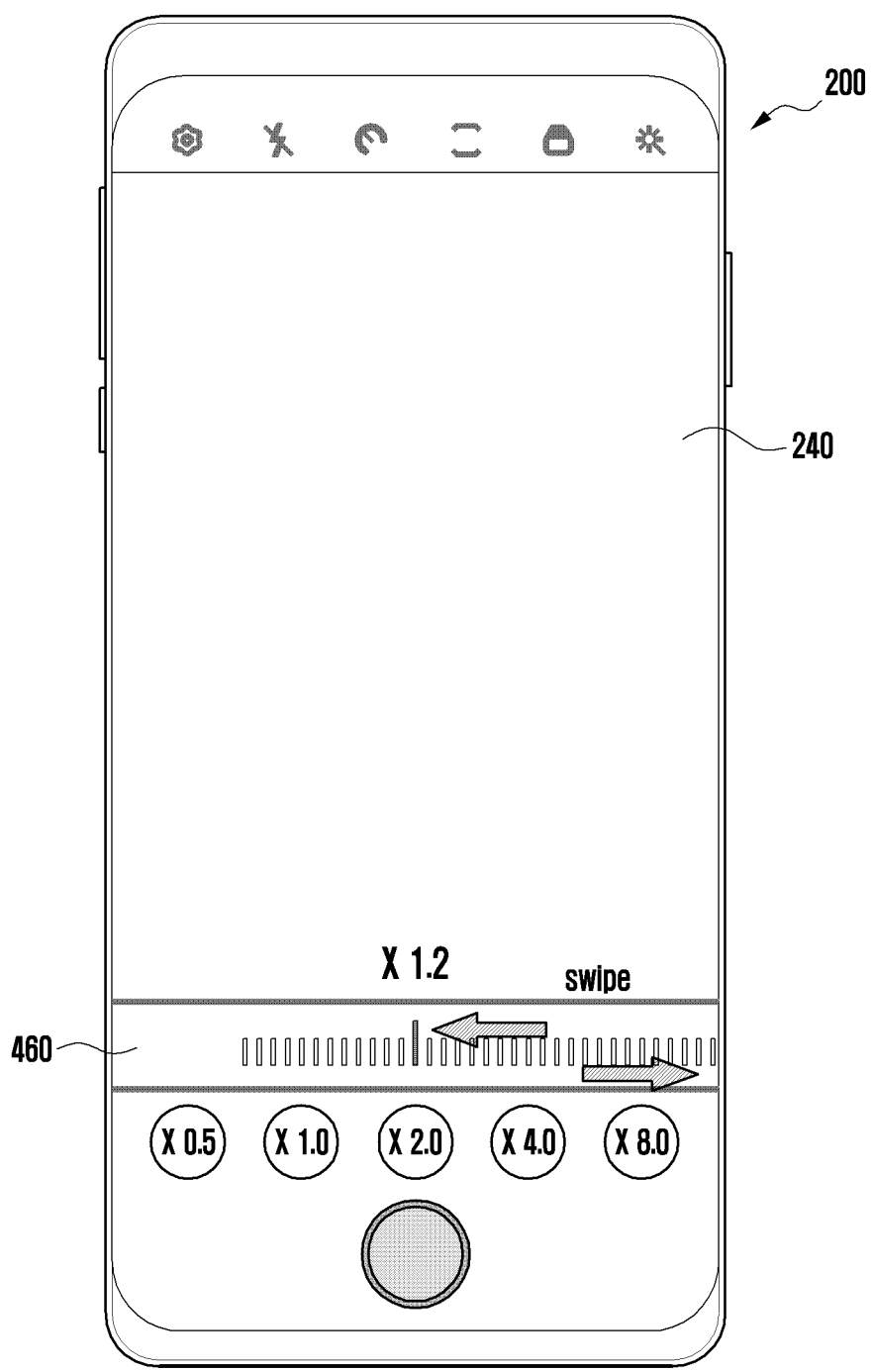
FIG. 7A illustrates a swipe touch input in a method for adjusting a camera magnification of an electronic device, according to an embodiment.

FIG. 7A illustrates a swipe touch input in a method for adjusting a camera magnification of an electronic device, according to an embodiment.

The instructions stored in the memory (e.g., the memory 130 in FIG. 1 or the memory 220 in FIG. 2) may cause the processor (e.g., the processor 120 in FIG. 1 or the processor 210 in FIG. 2) to receive, as the second user input, a swipe touch input on the screen of FIG. 5B or 6B displayed in response to receiving the first user input. In addition, the instructions may cause the processor to calculate a scroll speed corresponding to the received swipe touch input and thereby adjust the camera magnification.

Referring to FIG. 7A, the processor of the electronic device (e.g., the electronic device 101 in FIG. 1 or the electronic device 200 in FIG. 2) receives the swipe touch input on the zoom bar UI 460. This is, however, exemplary only. Alternatively, the processor may be set to adjust the camera magnification by receiving the swipe touch input on preview screen.

The swipe touch input in the left direction may be set to the zoom-in process of adjusting the camera magnification to a higher magnification, and the swipe touch input in the right direction may be set to the zoom-out process of adjusting the camera magnification to a low magnification. This is, however, exemplary only.

Figure 7B:
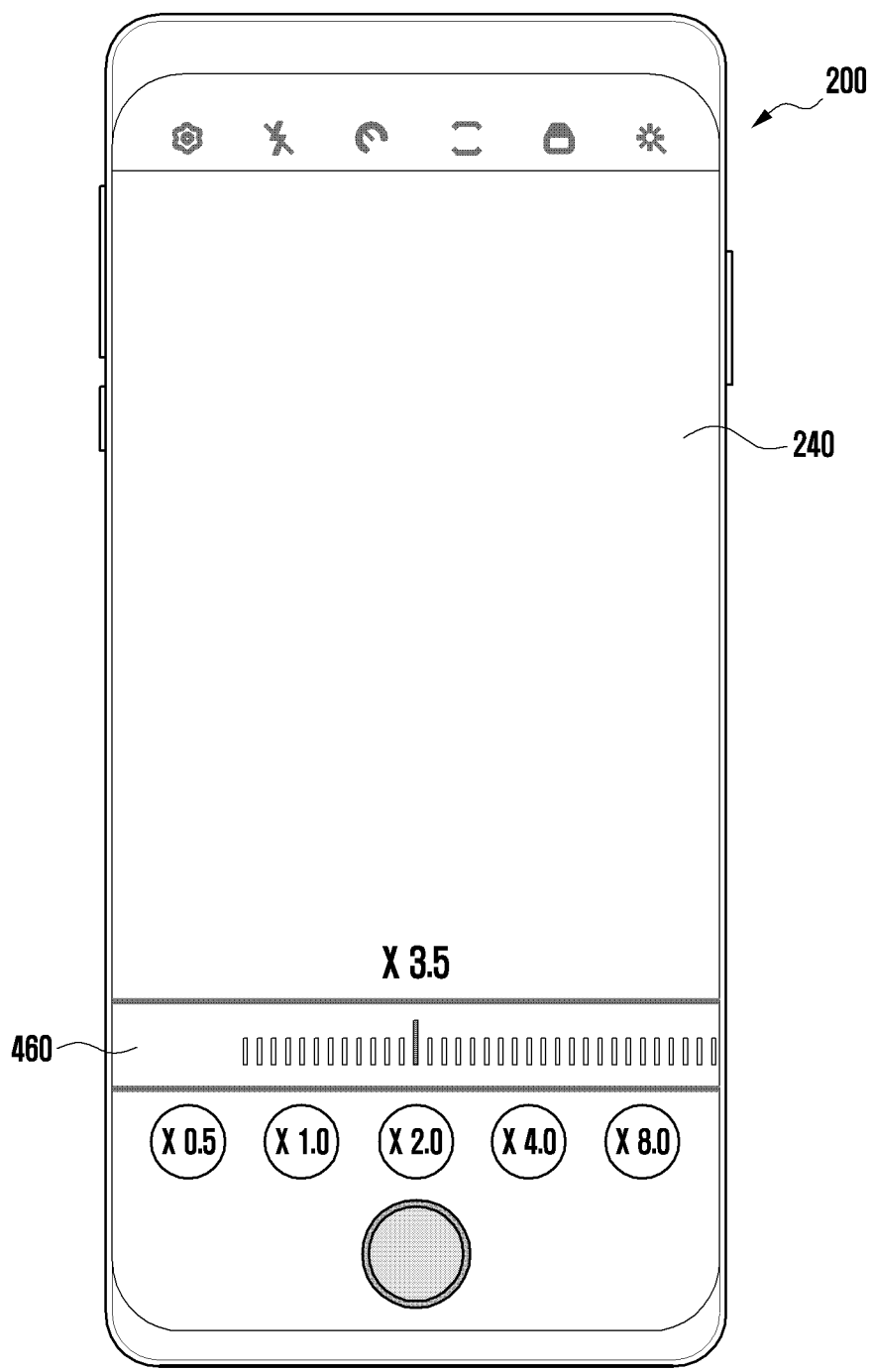
FIG. 7B illustrates a result of zooming in response to a swipe touch input in a method for adjusting a camera magnification of an electronic device, according to an embodiment.

FIG. 7B illustrates a result of zooming in response to a swipe touch input in a method for adjusting a camera magnification of an electronic device, according to an embodiment.

In response to receiving the swipe input as the second user input on the FIG. 7A screen, the processor may display an adjusted camera magnification corresponding to the received swipe input as shown in FIG. 7B and also display the preview screen corresponding to the adjusted camera magnification. This process of the processor may correspond to the above steps 306, 308, 309, and 310 in FIG. 3.

The instructions stored in the memory may cause the processor to return to the default screen of FIG. 5A or 6A when any user input is not received for a certain time (e.g., 2 seconds) in a state where the screen of FIG. 7A or 7B is displayed. The above time for returning to the default screen may restart whenever any user input is entered during the camera magnification adjustment.

Figure 8A:
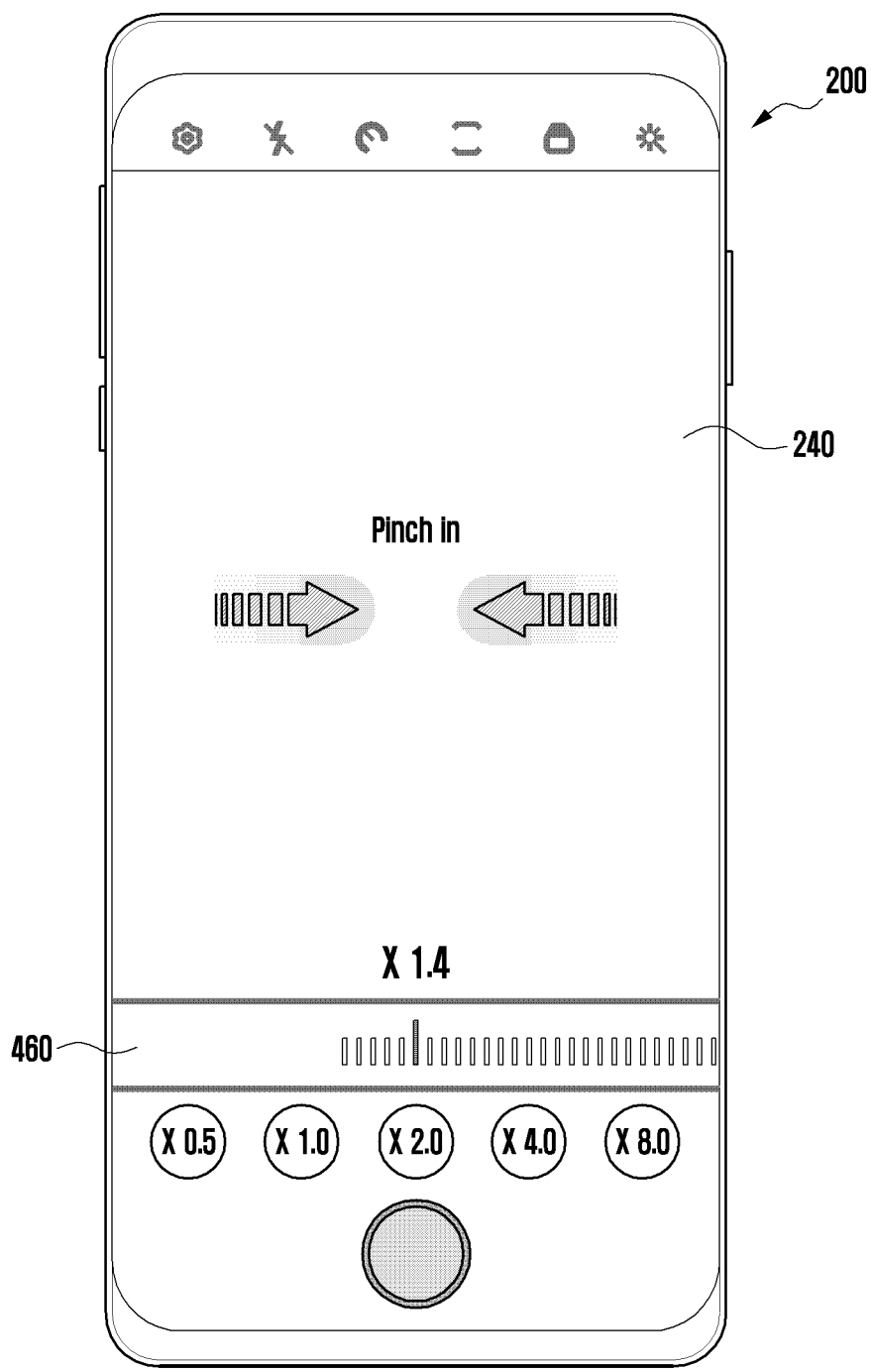
FIG. 8A illustrates a pinch-in touch input in a method for adjusting a camera magnification of an electronic device, according to an embodiment.

FIG. 8A illustrates a pinch-in touch input in a method for adjusting a camera magnification of an electronic device, according to an embodiment.

The instructions stored in the memory (e.g., the memory 130 in FIG. 1 or the memory 220 in FIG. 2) may cause the processor (e.g., the processor 120 in FIG. 1 or the processor 210 in FIG. 2) to receive, as the second user input, a pinch-in input on the screen of FIG. 5B or 6B displayed in response to receiving the first user input. In addition, the instructions may cause the processor to calculate a scroll speed corresponding to the received pinch-in input and thereby adjust the camera magnification.

In response to receiving the pinch-in input as the second user input as shown in FIG. 8A, the processor of the electronic device (e.g., the electronic device 101 in FIG. 1 or the electronic device 200 in FIG. 2) may perform a zoom-out process of adjusting the camera magnification to a lower camera magnification.

Figure 8B:
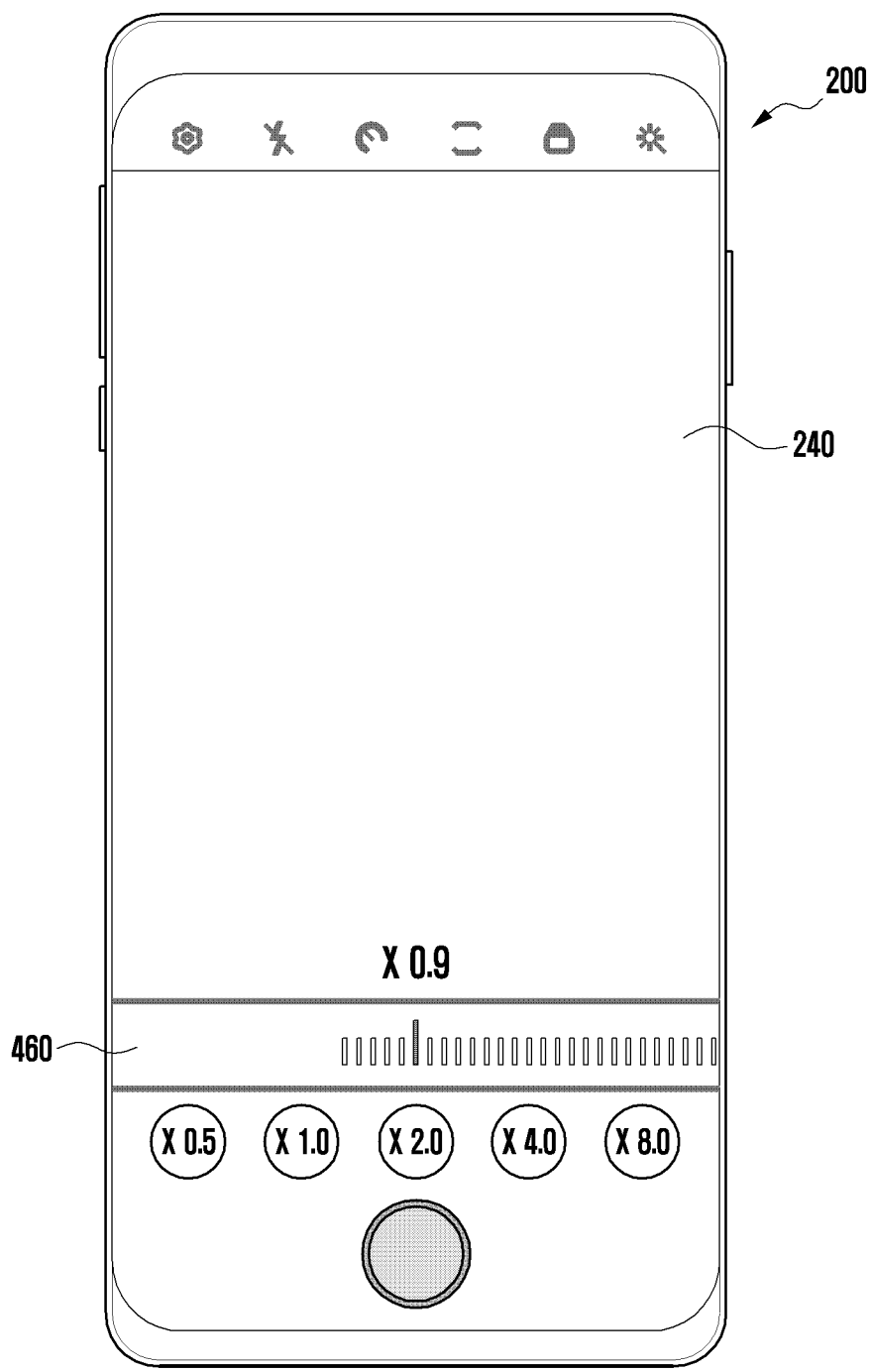
FIG. 8B illustrates a result of zooming-out in response to a pinch-in touch input in a method for adjusting a camera magnification of an electronic device, according to an embodiment.

FIG. 8B illustrates a result of zooming-out in response to a pinch-in touch input in a method for adjusting a camera magnification of an electronic device, according to an embodiment.

In response to receiving the pinch-in input as the second user input on the FIG. 8A screen, the processor may display an adjusted camera magnification corresponding to the received pinch-in input as illustrated in FIG. 8B and also display the preview screen corresponding to the adjusted camera magnification. This process of the processor may correspond to the above steps 306, 308, 309, and 310 in FIG. 3.

The instructions stored in the memory may cause the processor to return to the default screen of FIG. 5A or 6A when any user input is not received for a certain time (e.g., 2 seconds) in a state where the screen of FIG. 8A or 8B is displayed. The above time for returning to the default screen may restart whenever any user input is entered during the camera magnification adjustment.

Figure 9A:
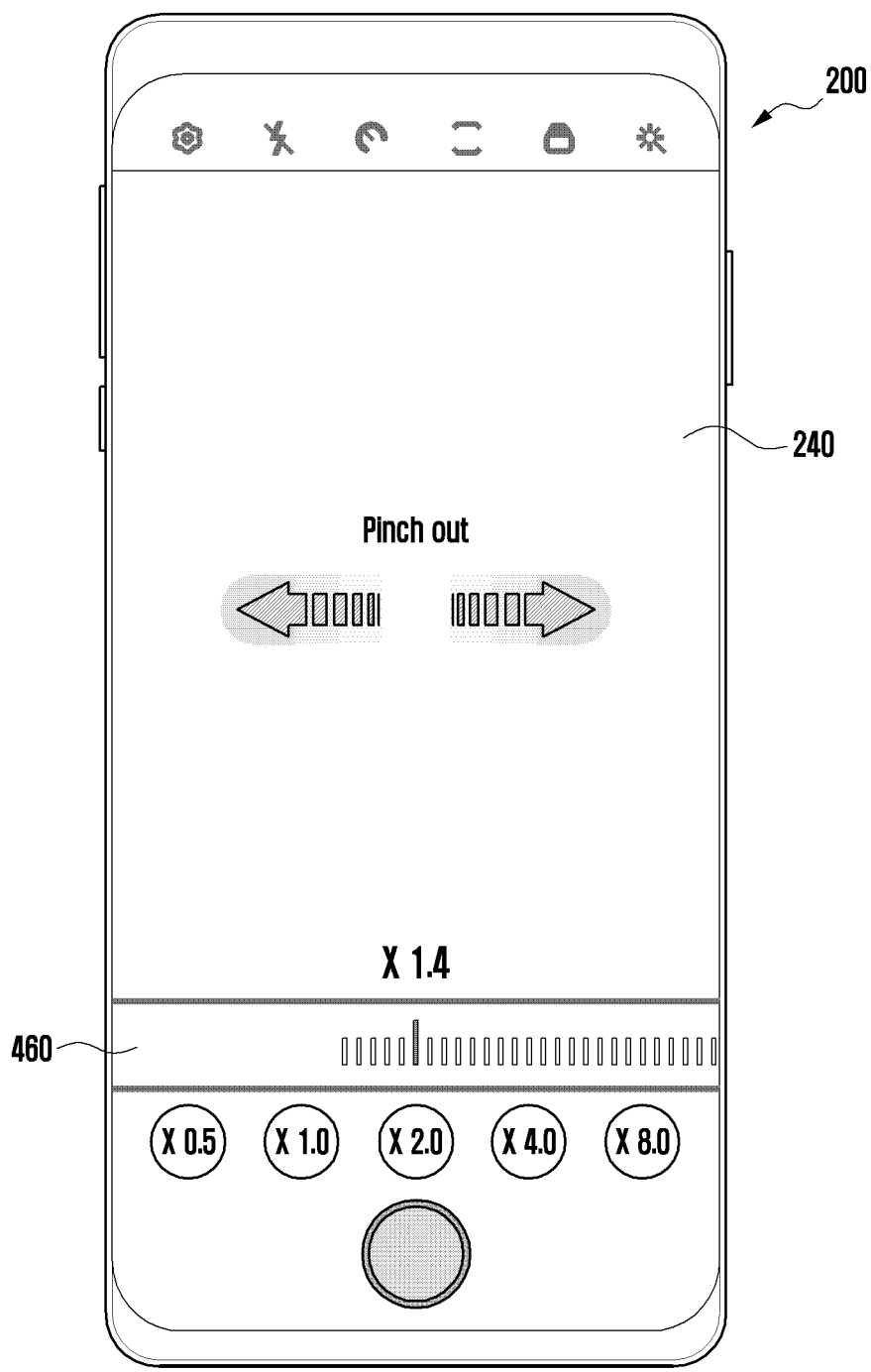
FIG. 9A illustrates a pinch-out touch input in a method for adjusting a camera magnification of an electronic device, according to an embodiment.

FIG. 9A illustrates a pinch-out touch input in a method for adjusting a camera magnification of an electronic device, according to an embodiment.

The instructions stored in the memory (e.g., the memory 130 in FIG. 1 or the memory 220 in FIG. 2) may cause the processor (e.g., the processor 120 in FIG. 1 or the processor 210 in FIG. 2) to receive, as the second user input, a pinch-out input on the screen of FIG. 5B or 6B displayed in response to receiving the first user input. In addition, the instructions may cause the processor to calculate a scroll speed corresponding to the received pinch-out input and thereby adjust the camera magnification.

In response to receiving the pinch-out input as the second user input as shown in FIG. 9A, the processor of the electronic device (e.g., the electronic device 101 in FIG. 1 or the electronic device 200 in FIG. 2) may perform a zoom-in process of adjusting the camera magnification to a higher camera magnification.

Figure 9B:
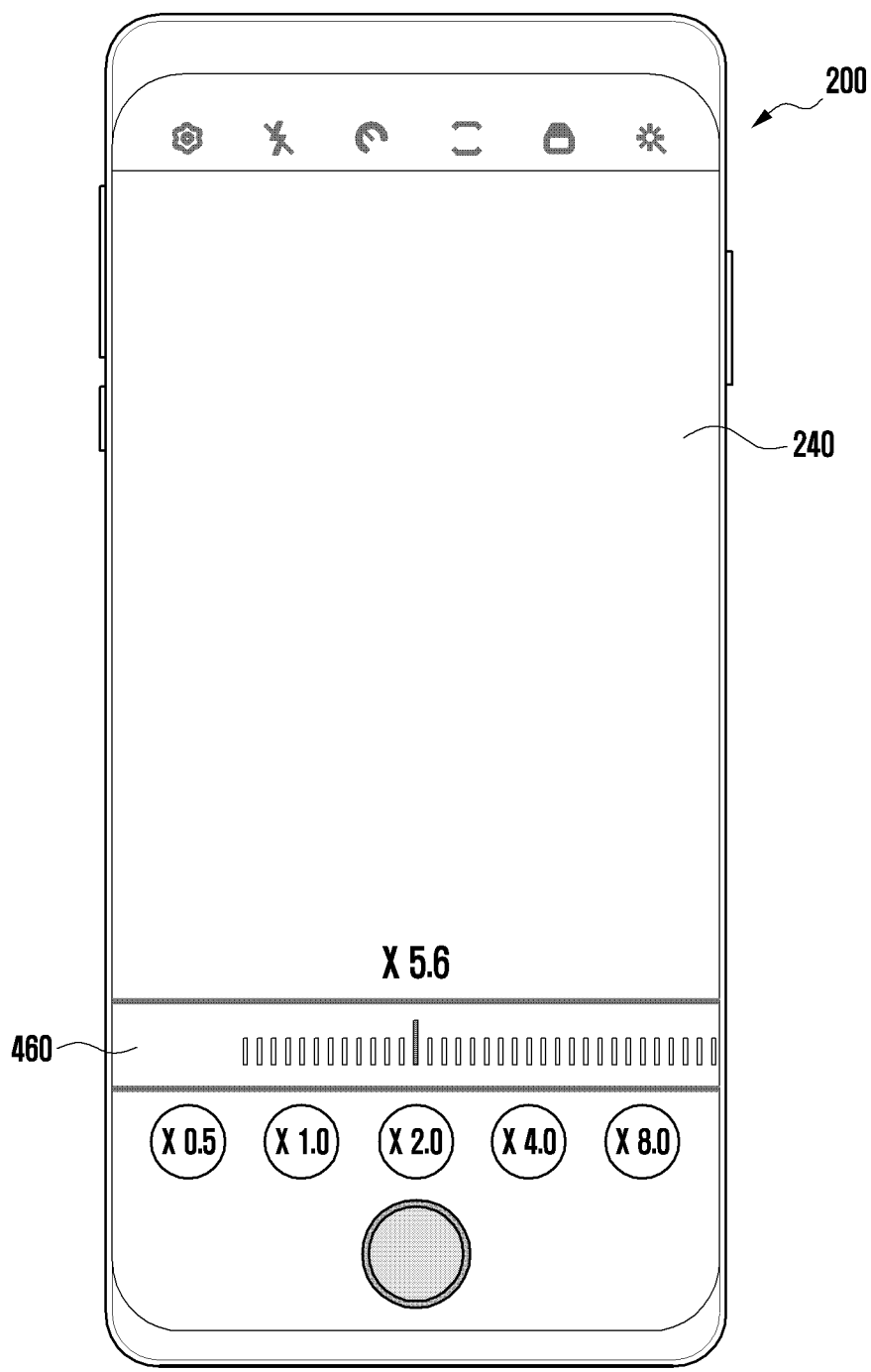
FIG. 9B illustrates a result of zooming-in in response to a pinch-out touch input in a method for adjusting a camera magnification of an electronic device, according to an embodiment.

FIG. 9B illustrates a result of zooming-in in response to a pinch-out touch input in a method for adjusting a camera magnification of an electronic device, according to an embodiment.

In response to receiving the pinch-out input as the second user input on the FIG. 9A screen, the processor may display an adjusted camera magnification corresponding to the received pinch-out input as shown in FIG. 9B and also display the preview screen corresponding to the adjusted camera magnification. This process of the processor may correspond to the above steps 306, 308, 309, and 310 in FIG. 3.

As also described with reference to FIGS. 6A and 6B, an input of clicking the volume button may be utilized as the second user input as well as the first user input. Specifically, an input of clicking the volume-down button may be set to replace the pinch-in input, and an input of clicking the volume-up button may be set to replace the pinch-out input. As described above, displaying the zoom bar UI and zooming in/out may be performed simultaneously even in case of the volume button input.

In response to receiving a user input of clicking the volume-up/down button, the processor may adjust the camera magnification through a calculation process of a zoom bar UI scroll speed as shown in FIG. 3 and also scroll along the zoom bar UI up to the camera magnification determined as the calculation result. A setting for converting a user input distance (i.e., a drag distance) corresponding to a user input type in order to calculate a scroll speed may be implemented with a separate table. In this embodiment, the speed of scrolling (or navigating) through the zoom bar UI in response to the user input of clicking the volume-up/down button may be determined through calculation in consideration of the acceleration factor for each section. Using the volume button click as the second user input may be interpreted as a desire to quickly adjust the camera magnification, so that it may be set to navigate through the zoom bar UI at the maximum speed for each allocated section. The calculation of the scroll distance (or speed) in case of the button click input may be performed through conversion into a distance corresponding to a button click speed by setting of software as described above with reference to FIG. 4, which may be changed and/or customized.

As also described with reference to FIGS. 6A and 6B, an input using the BLE pen may be utilized as the second user input as well as the first user input. For example, a gesture input of pressing the BLE pen on the screen and rotating the BLE pen clockwise may replace the pinch-out input, and a gesture input of pressing the BLE pen on the screen and rotating the BLE pen counter-clockwise may replace the pinch-in input. As described above, displaying the zoom bar UI and zooming in/out may be performed simultaneously even in case of the gesture input using the BLE pen.

In response to receiving a user input using the BLE pen (e.g., one of various gesture inputs in a state where a pen button is pressed), the processor may adjust the camera magnification through a calculation process of a zoom bar UI scroll speed as shown in FIG. 3 and also scroll along the zoom bar UI up to the camera magnification determined as the calculation result. A setting for converting a user input distance (i.e., a drag distance) corresponding to a user input type in order to calculate a scroll speed may be implemented with a separate table. The speed of scrolling (or navigating) through the zoom bar UI in response to the user input using the BLE pen may be determined through calculation in consideration of the acceleration factor for each section. The calculation of the scroll distance (or speed) in case of the BLE pen input may be performed through conversion into a distance corresponding to a button click speed by setting of software as described above with reference to FIG. 4, which may be changed and/or customized.

The instructions stored in the memory may cause the processor to return to the default screen of FIG. 5A or 6A when any user input is not received for a certain time (e.g., 2 seconds) in a state where the screen of FIG. 9A or 9B is displayed. The above time for returning to the default screen may restart whenever any user input is entered during the camera magnification adjustment.

Figure 10A:
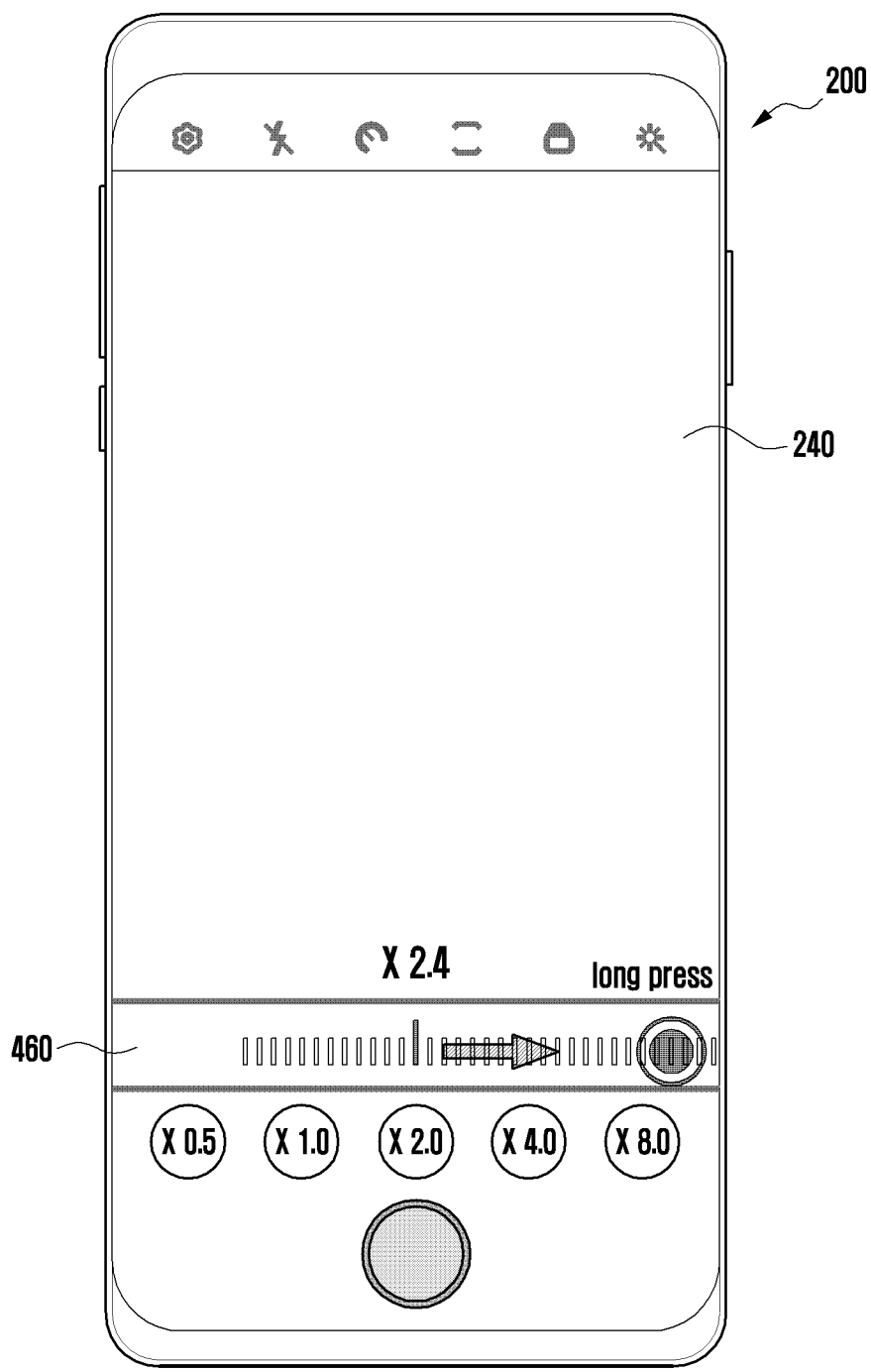
FIG. 10A illustrates a long press touch input in a method for adjusting a camera magnification of an electronic device, according to an embodiment.

FIG. 10A illustrates a long press touch input in a method for adjusting a camera magnification of an electronic device, according to an embodiment.

The instructions stored in the memory (e.g., the memory 130 in FIG. 1 or the memory 220 in FIG. 2) may cause the processor (e.g., the processor 120 in FIG. 1 or the processor 210 in FIG. 2) to receive, as the second user input, a long press touch input on the screen of FIG. 5B or 6B displayed in response to receiving the first user input. In addition, the instructions may cause the processor to calculate a scroll speed corresponding to the received long press touch input and thereby adjust the camera magnification.

In response to receiving the long press touch input as the second user input as shown in FIG. 10A, the processor of the electronic device (e.g., the electronic device 101 in FIG. 1 or the electronic device 200 in FIG. 2) may adjust the camera magnification. The instructions stored in the memory may distinguish the long press touch input from other types of the second user input when the processor adjusts the camera magnification. For example, the instructions may be set to recognize a press touch input of a predetermined time (e.g., 1 second) or more as the long press touch input. This is, however, exemplary only.

Referring to FIG. 10A, the processor receives the long press touch input on the zoom bar UI 460. This is, however, exemplary only. Alternatively, the processor may be set to adjust the camera magnification by receiving the long press touch input on preview screen displayed on the display. In this case, the long press touch input on a right region of the display may be set to increase the camera magnification, and the long press touch input on a left region of the display may be set to reduce the camera magnification.

As illustrated in FIG. 10A, the long press touch input on the right region may be set to the zoom-in process of adjusting the camera magnification to a higher magnification. Similarly, although not shown, the long press touch input on the left direction may be set to the zoom-out process of adjusting the camera magnification to a low magnification. This is, however, exemplary only.

In response to receiving the long press touch input, the processor may adjust the camera magnification through a calculation process of a zoom bar UI scroll speed as shown in FIG. 3 and also scroll along the zoom bar UI up to the camera magnification determined as the calculation result. A setting for converting a user input distance (i.e., a drag distance) corresponding to a user input type in order to calculate a scroll speed may be implemented with a separate table. The speed of scrolling (or navigating) through the zoom bar UI in response to the long press touch input may be determined through calculation in consideration of the acceleration factor for each section. Using the long press touch input as the second user input may be interpreted as a desire to quickly adjust the camera magnification, so that it may be set to navigate through the zoom bar UI at the maximum speed for each allocated section. The calculation of the scroll distance (or speed) in case of the long press touch input may be performed through conversion into a distance corresponding to a long press time by setting of software as described above with reference to FIG. 4, which may be changed and/or customized.

Figure 10B:
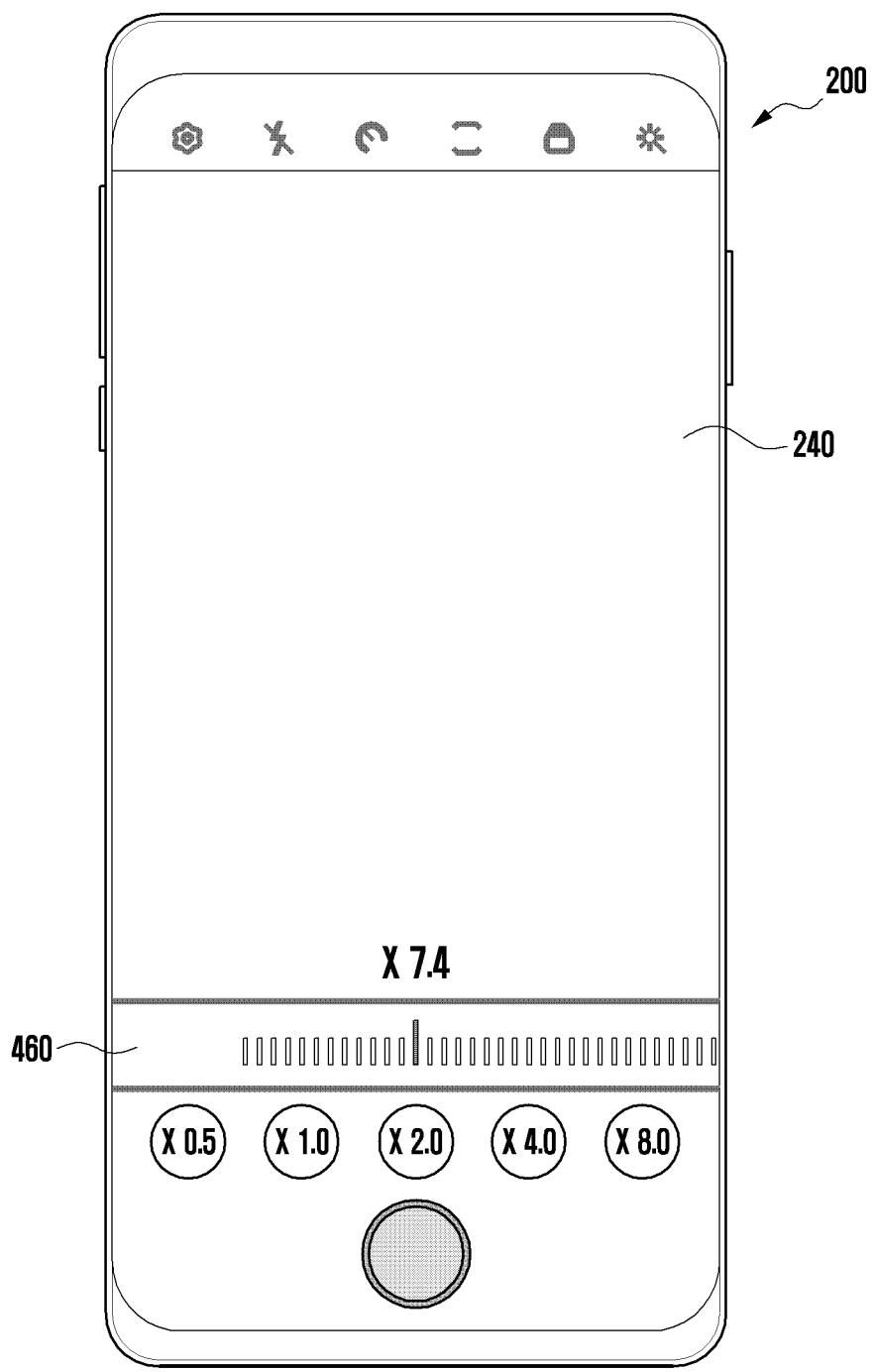
FIG. 10B illustrates a result of zooming in response to a long press touch input in a method for adjusting a camera magnification of an electronic device, according to an embodiment.

FIG. 10B illustrates a result of zooming in response to a long press touch input in a method for adjusting a camera magnification of an electronic device, according to an embodiment.

In response to receiving the long press touch input as the second user input on the FIG. 10A screen, the processor may display an adjusted camera magnification corresponding to the received long press touch input as shown in FIG. 10B and also display the preview screen corresponding to the adjusted camera magnification. This process of the processor may correspond to the above steps 306, 308, 309, and 310 in FIG. 3.

As described above, FIGS. 4 and 7A to 10B illustrate various methods of adjusting the camera magnification of the electronic device in response to receiving the first and/or second user input(s). The camera magnification adjustment in case of receiving the second user input of selecting a specific camera magnification in the UI containing specific magnification indications as shown in FIGS. 5B and 6B may also be performed through the same and/or similar process as the above embodiments.

In response to receiving a user input of selecting a specific camera magnification, the processor may adjust the camera magnification in accordance with the selected camera magnification and also scroll along the zoom bar UI up to the selected camera magnification. The speed of scrolling (or navigating) through the zoom bar UI up to the selected camera magnification may be determined through calculation in consideration of the acceleration factor for each section. Selecting the specific camera magnification as the second user input may be interpreted as a desire to quickly adjust the camera magnification, so that it may be set to navigate through the zoom bar UI at the maximum speed for each allocated section.

The instructions stored in the memory may cause the processor to return to the default screen of FIG. 5A or 6A when any user input is not received for a certain time (e.g., 2 seconds) in a state where the screen of FIG. 10A or 10B is displayed. The above time for returning to the default screen may restart whenever any user input is entered during the camera magnification adjustment.

Figure 11A:
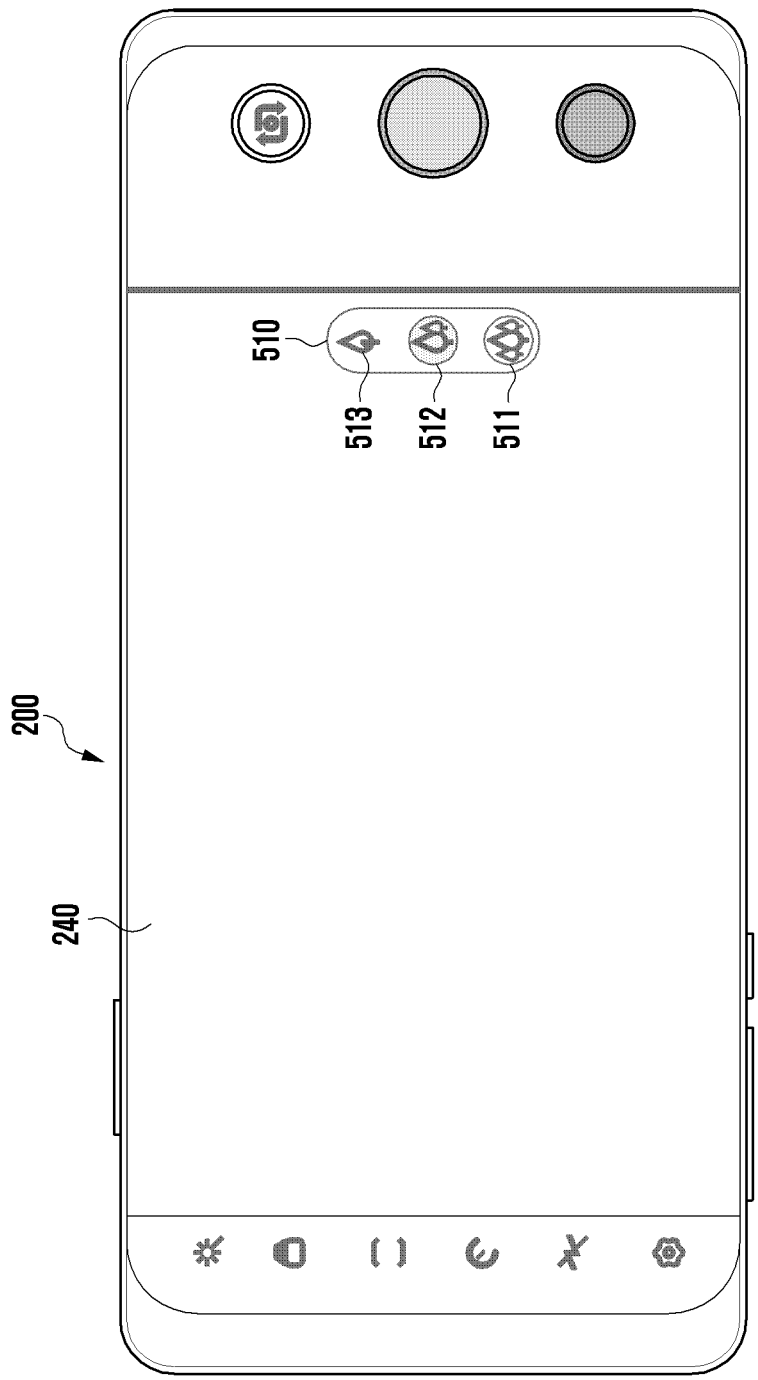
FIG. 11A illustrates a screen of receiving a first user input for displaying a zoom bar UI in a landscape mode of an electronic device, according to an embodiment.

FIG. 11A illustrates a screen of receiving a first user input for displaying a zoom bar UI in a landscape mode of an electronic device, according to an embodiment.

Figure 11B:
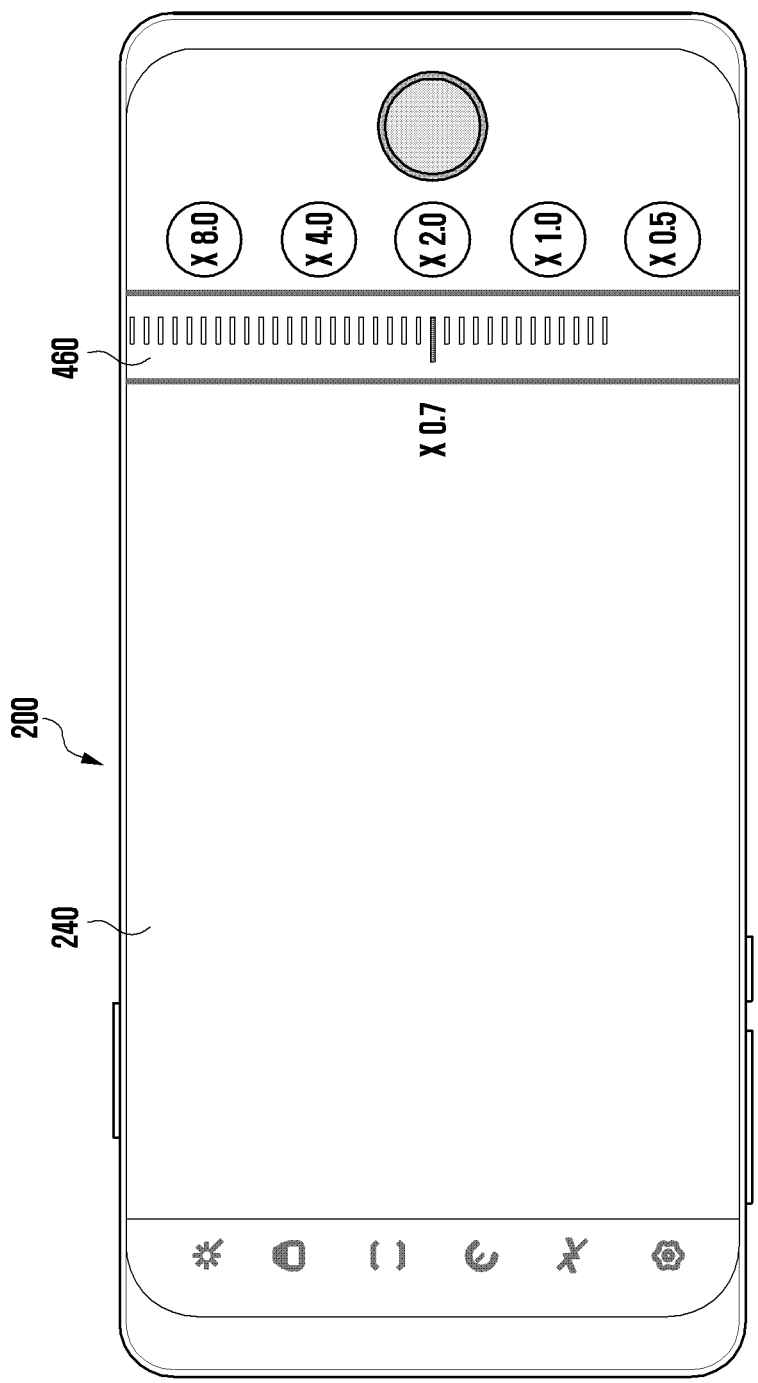
FIG. 11B illustrates a screen related to camera magnification adjustment including displaying a zoom bar UI in a landscape mode of an electronic device, according to an embodiment.

FIG. 11B illustrates a screen related to camera magnification adjustment including displaying a zoom bar UI in a landscape mode of an electronic device, according to an embodiment.

The electronic device (e.g., the electronic device 101 in FIG. 1 or the electronic device 200 in FIG. 2) may have two display modes, that is, a portrait mode as shown in FIG. 5A and a landscape mode as shown in FIG. 11A. When the camera (e.g., the camera module 180 in FIG. 1 or the camera in FIG. 2) is activated in the landscape mode, that is, when the camera application is executed, a default screen is displayed as if the electronic device is rotated by 90 degrees as shown in FIG. 11A.

A method of adjusting the camera magnification in the landscape mode may be same as that described with reference to FIGS. 5A to 10B excepting that the electronic device is rotated by 90 degrees.

Figure 12:
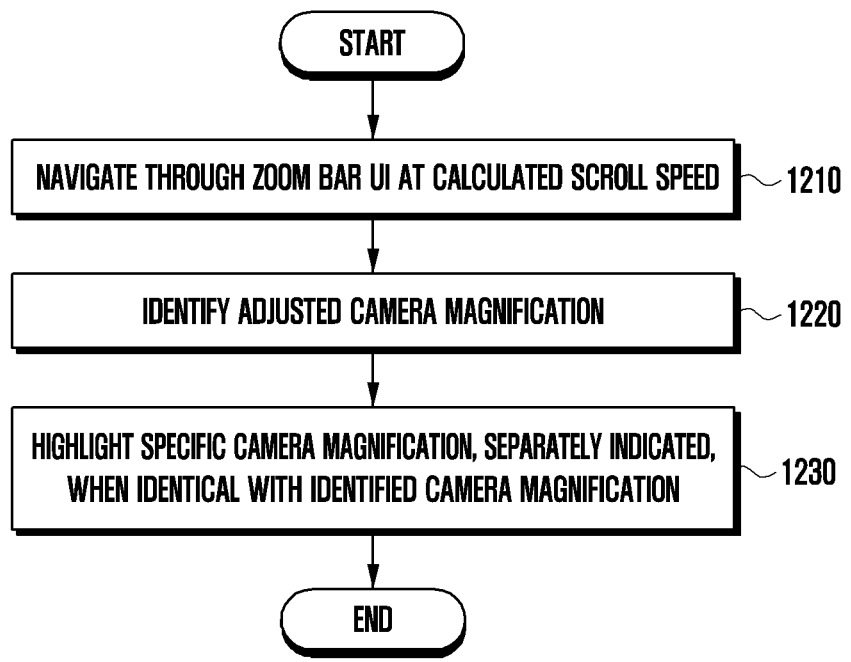
FIG. 12 is a flow diagram illustrating a process of highlighting a specific magnification display in camera magnification adjustment of an electronic device, according to an embodiment.

FIG. 12 is a flow diagram illustrating a process of highlighting a specific magnification display in camera magnification adjustment of an electronic device, according to an embodiment. In this process, respective operations corresponding to respective blocks depicted in the flow diagram may be performed sequentially, but this is not necessary. For example, the order of such operations may be changed at least in part, and at least two operations may be performed in parallel or concurrently. In addition, at least one operation may be omitted if necessary.

The instructions stored in the memory (e.g., the memory 130 in FIG. 1 or the memory 220 in FIG. 2) may cause the processor (e.g., the processor 120 in FIG. 1 or the processor 210 in FIG. 2) to receive a user input (e.g., a first user input and/or a second user input) for adjusting a magnification of a camera (e.g., the camera module 180 in FIG. 1 or the camera 230 in FIG. 2) and navigate through the zoom bar UI 460 at a scroll speed calculated at step 1210.

The instructions stored in the memory cause the processor to identify, at step 1220, the camera magnification adjusted at step 1210 (e.g., adjusted to the camera magnification 4.0).

The instructions stored in the memory cause the processor to, when one of specific camera magnifications (e.g., 1.0, 2.0, 4.0, etc.), separately indicated, is identical with the camera magnification (e.g., 4.0) identified at step 1220, highlight the identical camera magnification at step 1230.

Figure 13A:
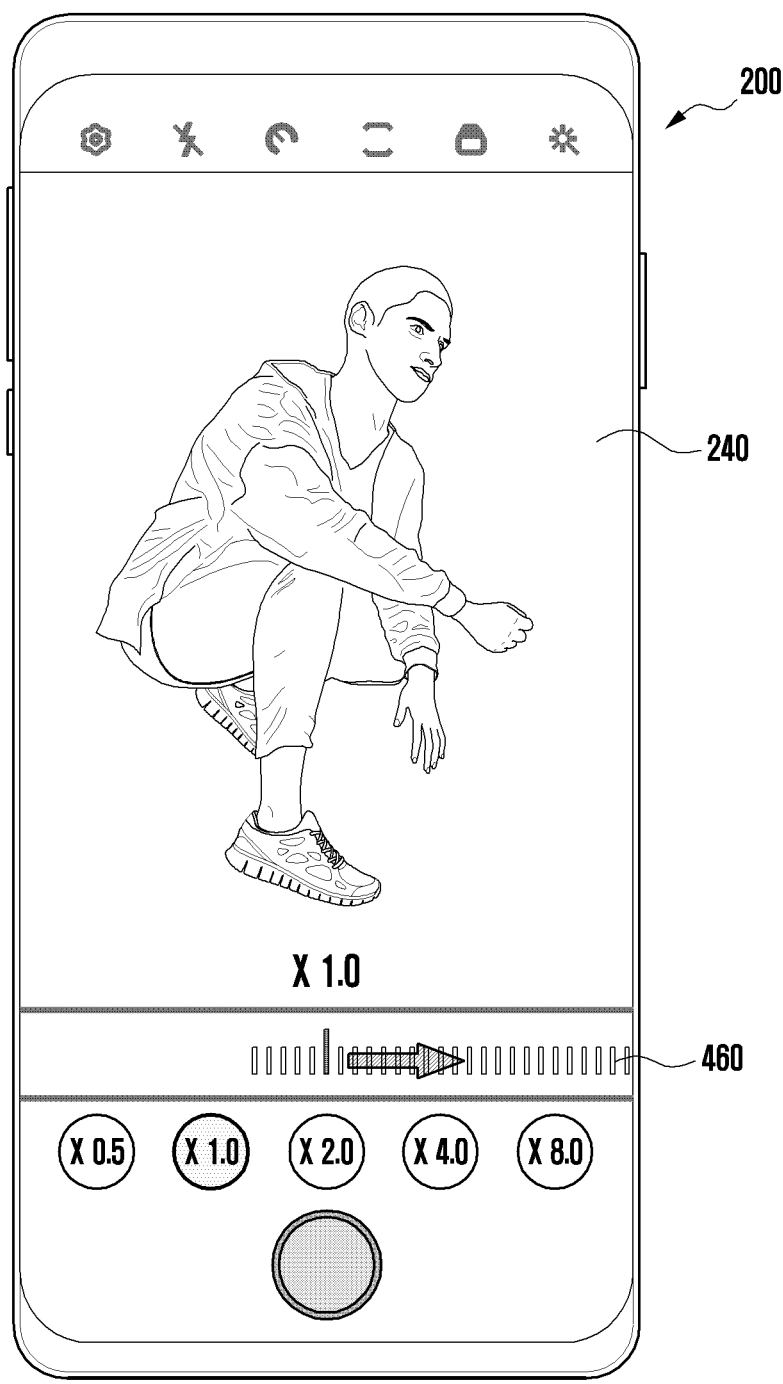
FIG. 13A illustrates a process of highlighting a specific magnification display in a method for adjusting a camera magnification of an electronic device, according to an embodiment.

FIG. 13A illustrates a process of highlighting a specific magnification display in a method for adjusting a camera magnification of an electronic device, according to an embodiment.

Figure 13B:
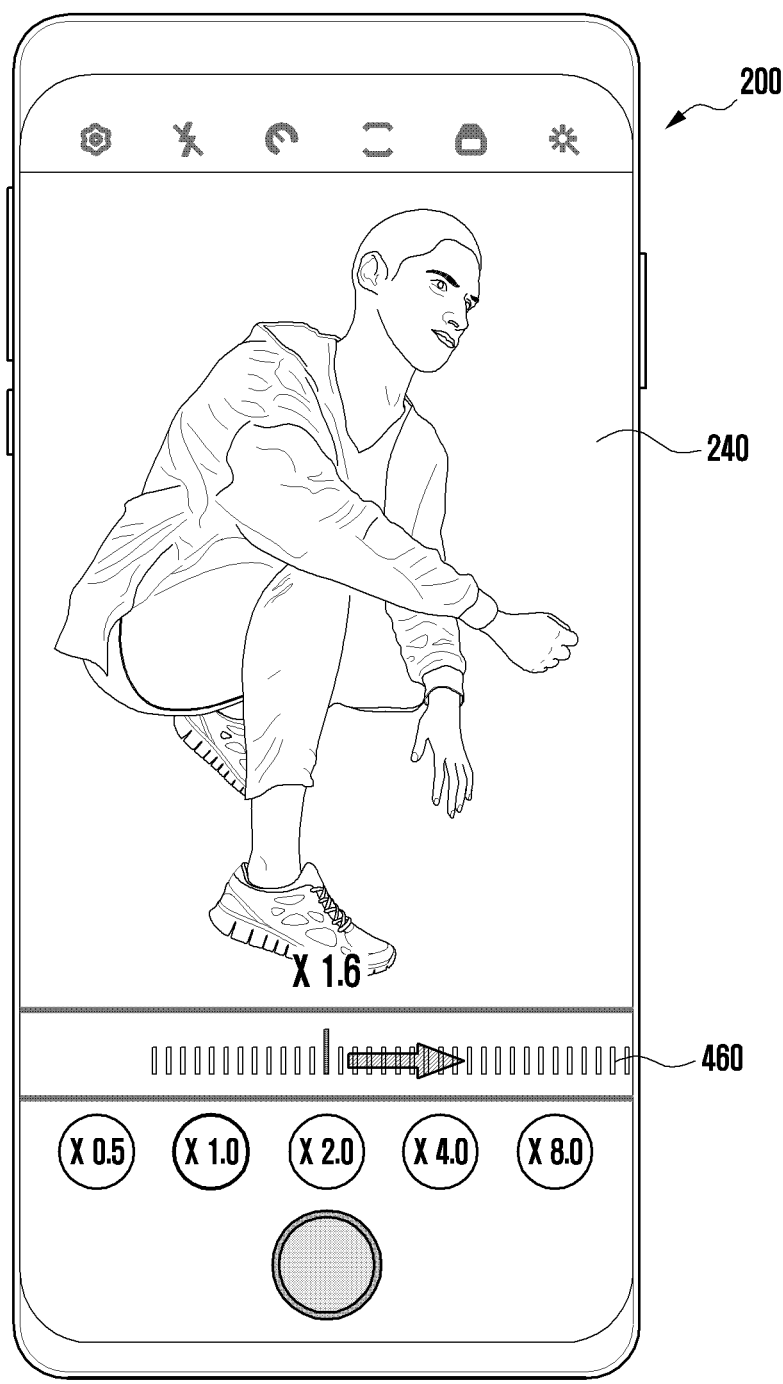
FIG. 13B illustrates a process of highlighting a specific magnification display in a method for adjusting a camera magnification of an electronic device, according to an embodiment.

FIG. 13B illustrates a process of highlighting a specific magnification display in a method for adjusting a camera magnification of an electronic device, according to an embodiment.

Figure 13C:
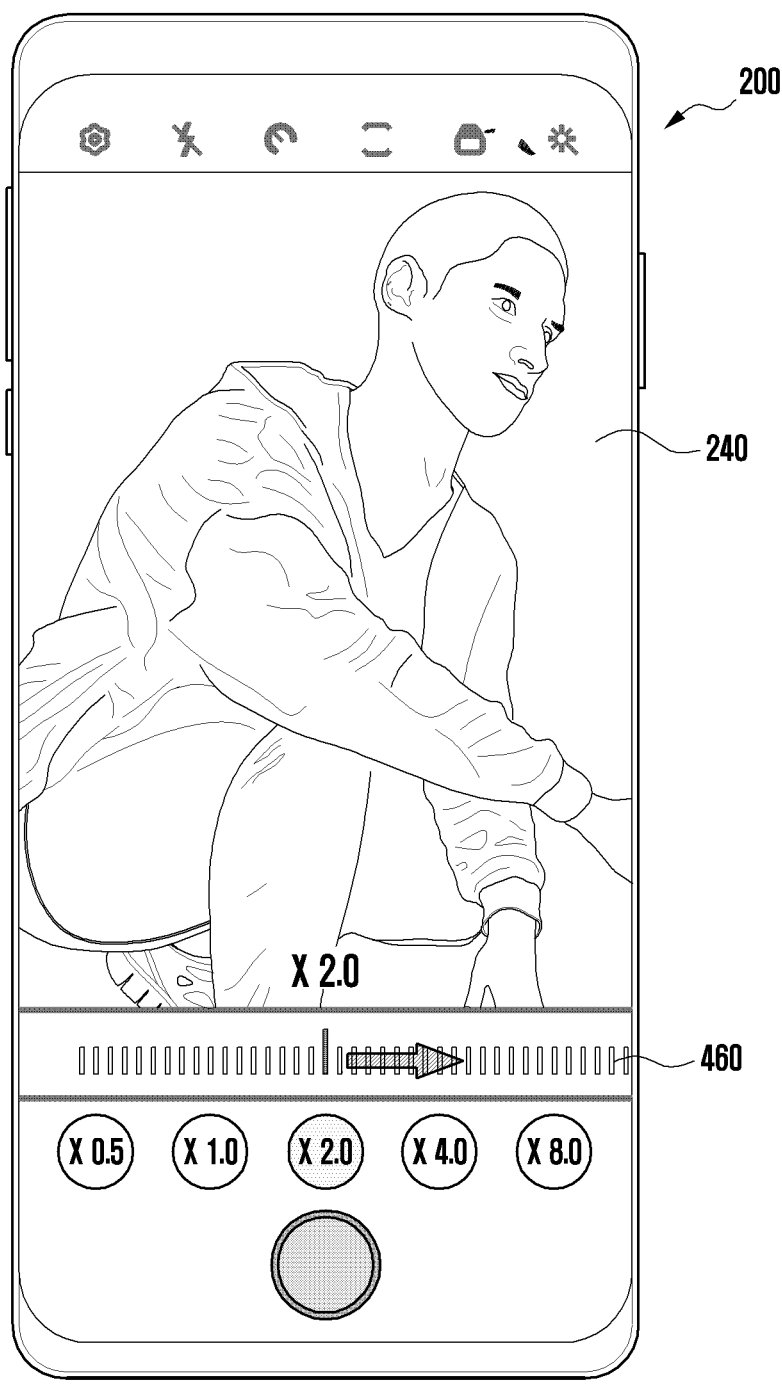
FIG. 13C illustrates a process of highlighting a specific magnification display in a method for adjusting a camera magnification of an electronic device, according to an embodiment.

FIG. 13C illustrates a process of highlighting a specific magnification display in a method for adjusting a camera magnification of an electronic device, according to an embodiment.

Figure 13D:
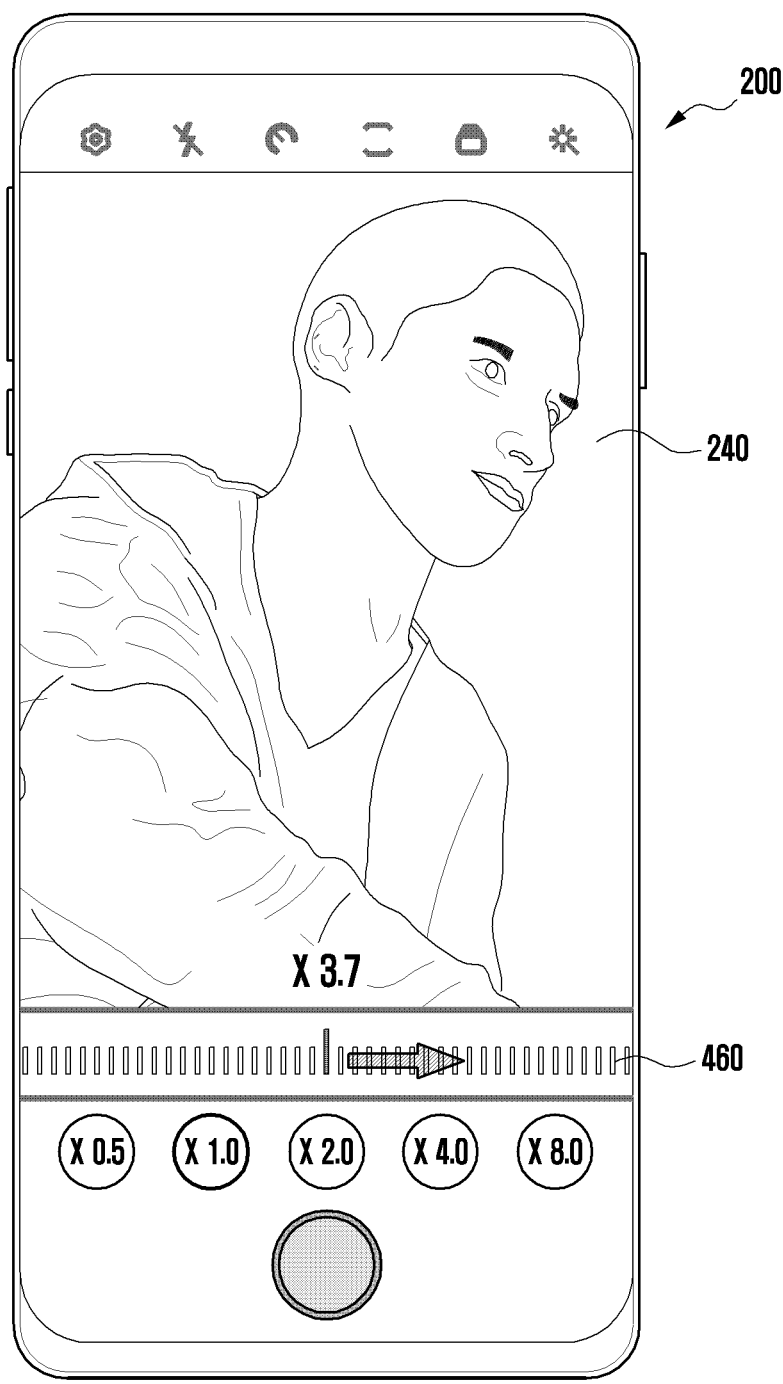
FIG. 13D illustrates a process of highlighting a specific magnification display in a method for adjusting a camera magnification of an electronic device, according to an embodiment.

FIG. 13D illustrates a process of highlighting a specific magnification display in a method for adjusting a camera magnification of an electronic device, according to an embodiment.

Referring to FIGS. 13A to 13D, the processor (e.g., the processor 120 in FIG. 1 or the processor 210 in FIG. 2) may perform instructions configured to receive a first user input and/or a second user input and then adjust a magnification of a camera (e.g., the camera module 180 in FIG. 1 or the camera 230 in FIG. 2). FIGS. 13A to 13D illustrate a process of camera magnification adjustment (zoom-in or enlargement) using a swipe touch input as the second user input.

Referring to FIG. 13A, the processor of the electronic device (e.g., the electronic device 101 in FIG. 1 or the electronic device 200 in FIG. 2) may identify a camera magnification of 1.0 on the zoom bar UI, and thereby highlight a specific camera magnification of 1.0 among separately indicated specific camera magnifications. The swipe touch input illustrated in FIGS. 13A to 13D is merely one example of user inputs.

Referring to FIG. 13B, the processor may identify a camera magnification of 1.6 on the zoom bar UI, determine that the identified camera magnification does not match the separately indicated specific camera magnifications, and thereby display no highlight. A preview screen of FIG. 13B is zoomed-in (or enlarged) by the camera magnification adjustment than a preview screen of FIG. 13A.

Referring to FIG. 13C, the processor may identify a camera magnification of 2.0 on the zoom bar UI, and thereby highlight a specific camera magnification of 2.0 among the separately indicated specific camera magnifications. A preview screen of FIG. 13C is further zoomed-in (or enlarged) by the camera magnification adjustment than the preview screen of FIG. 13B.

Referring to FIG. 13D, the processor may identify a camera magnification of 3.7 on the zoom bar UI, determine that the identified camera magnification does not match the separately indicated specific camera magnifications, and thereby display no highlight. A preview screen of FIG. 13D is further zoomed-in (or enlarged) by the camera magnification adjustment than the preview screen of FIG. 13C.

Although FIGS. 13A to 13D illustrate an enlargement process (or zoom-in process) by the camera magnification adjustment, a reduction process (or zoom-out process) may be performed in a similar manner. In addition, the above-described steps 1210 to 1230 in FIG. 12 may also be applied to a case of receiving a touch input, as the second user input, for selecting a specific camera magnification, and in this case, it is possible to directly display the screen such as FIG. 13A or 13C while navigating through the zoom bar UI at a maximum speed.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a display;
   a plurality of cameras, wherein the plurality of cameras have a magnification-adjustable section different from each other;
   a memory; and
   a processor operatively connected to the display, the plurality of cameras, and the memory,
   wherein the memory stores instructions, which when executed, cause the processor to:
      identify a camera magnification of each of the plurality of cameras in response to an execution of a camera application of the electronic device,
      receive a first user input for adjusting a camera magnification of a specific camera among the plurality of cameras,
      display a scrollable user interface (UI) for adjusting the camera magnification in response to receiving the first user input, wherein the scrollable UI includes a specific section corresponding to the specific camera among the different magnification-adjustable sections, and each of the different magnification-adjustable sections is corresponding to a camera magnification of a different camera among the plurality of cameras,
      calculate a scroll speed on the displayed scrollable UI by using an acceleration factor corresponding to the received first user input or a second user input received on the specific section corresponding to the specific camera among the different magnification-adjustable sections, and an input speed of the first user input or the second user input,
      adjust the camera magnification of the specific camera among the plurality of cameras by using the calculated scroll speed,
      display a related camera magnification UI including a plurality of magnification icons based on frequently used camera magnifications,
      adjust the camera magnification in response to receiving a touch input to the related camera magnification UI, wherein adjusting the camera magnification includes identifying the specific camera among the plurality of cameras, and using the identified specific camera for adjusting a camera magnification, and
      highlight, based on identifying that the adjusted camera magnification using the calculated scroll speed is identical to a camera magnification assigned to one of the plurality magnification icons, the one of the plurality magnification icons,
   wherein each of the different magnification-adjustable sections is displayed to have a predetermined number of gradations and to have a different length,
   wherein a camera magnification of the specific camera among the plurality of cameras is set to change in response to a user input moving along the gradations and being received on the specific section corresponding to the camera magnification of the specific camera and based on an amount of the number of gradations along which the user input moves,
   wherein the number of gradations along which the user input moves is set to increase in proportion to the length of in the specific section
   wherein an interval of the gradations is same across all sections, and
   wherein the length of the specific section is set as the number of gradations in the specific section multiplied by the interval of the gradations.

2. The electronic device of claim 1, wherein the different magnification-adjustable sections include a first section having a first number of gradations and a second section having a second number of gradations, and
   wherein the first number of gradations is different than the second number of gradations.

3. The electronic device of claim 1, wherein a change in the camera magnification per an interval of the gradations is different in each of the different magnification-adjustable sections.

4. The electronic device of claim 1, wherein the acceleration factor is an acceleration factor for each of the different magnification-adjustable sections corresponding to the scroll speed of the first user input or the second user input.

5. The electronic device of claim 1, wherein the first user input includes one of a hold input, a pinch input, a click input of a volume button, or a gesture input using a bluetooth low energy (BLE) pen, and
  wherein the second user input includes one of a pinch input, a click input of the volume button, a gesture input using the BLE pen, a swipe input, a long press input, or a touch input for a specific camera magnification.

6. The electronic device of claim 1, wherein the instructions, when executed, further cause the processor to:
  identify a specific camera magnification selected by the received touch input, and
  scroll an indication of the camera magnification on the scrollable UI to match the identified specific camera magnification.

7. The electronic device of claim 6, wherein the instructions for scrolling the indication of the camera magnification on the scrollable UI to match the identified specific camera magnification are configured to perform a same calculation as the instructions for adjusting the camera magnification by using the calculated scroll speed.

8. A method for adjusting a camera magnification in an electronic device, the method comprising:
  identifying a camera magnification of each of a plurality of cameras, included in the electronic device in response to an execution of a camera application of the electronic device, wherein the plurality of cameras have a magnification-adjustable section different from each other;
  receiving a first user input for adjusting a camera magnification of a specific camera among the plurality of cameras;
  displaying a scrollable user interface (UI) for adjusting the camera magnification in response to receiving the first user input, wherein the scrollable UI includes a specific section corresponding to the specific camera among the different magnification-adjustable sections, and each of the different magnification-adjustable sections is corresponding to a camera magnification of a different camera among the plurality of cameras;
  calculating a scroll speed on the displayed scrollable UI by using an acceleration factor corresponding to the received first user input or a second user input received on the specific section corresponding to the specific camera among the different magnification-adjustable sections, and an input speed of the first user input or the second user input;
  adjusting the camera magnification of the specific camera among the plurality of cameras by using the calculated scroll speed;
  displaying a related camera magnification UI including a plurality of magnification icons based on frequently used camera magnifications;
  adjusting the camera magnification in response to receiving a touch input to the related camera magnification UI,
  wherein adjusting the camera magnification includes:
    identifying the specific camera among the plurality of cameras, and
    using the identified specific camera for adjusting a camera magnification; and
  highlighting, based on identifying that the adjusted camera magnification using the calculated scroll speed is identical to a camera magnification assigned to one of the plurality magnification icons, the one of the plurality magnification icons,
  wherein each of the different magnification-adjustable sections is displayed to have a predetermined number of gradations and to have a different length,
  wherein a camera magnification of the specific camera among the plurality of cameras is set to change in response to a user input moving along the gradations and being received on the specific section corresponding to the camera magnification of the specific camera and based on an amount of the number of gradations along which the user input moves,
  wherein the number of gradations along which the user input moves is set to increase in proportion to the length of the specific section,
  wherein an interval of the gradations is same across all sections, and
  wherein the length of the specific section is set as the number of gradations in the specific section multiplied by the interval of the gradations.

9. The method of claim 8, wherein the different magnification-adjustable sections include a first section having a first number of gradations and a second section having a second number of gradations, and
  wherein the first number of gradations is different than the second number of gradations.

10. The method of claim 8, wherein a change in the camera magnification per an interval of the gradations is different in each of the different magnification-adjustable sections.

11. The method of claim 8, wherein the acceleration factor is an acceleration factor for each of the different magnification-adjustable sections corresponding to the scroll speed of the first user input or the second user input.

12. The method of claim 8, wherein the first user input includes one of a hold input, a pinch input, a click input of a volume button, or a gesture input using a bluetooth low energy (BLE) pen, and
  wherein the second user input includes one of a pinch input, a click input of the volume button, a gesture input using the BLE pen, a swipe input, a long press input, or a touch input for a specific camera magnification.

13. The method of claim 8, wherein adjusting the camera magnification includes:
  identifying a specific camera magnification selected by the received touch input, and
  scrolling an indication of the camera magnification on the UI to match the identified specific camera magnification.

14. The method of claim 13, wherein scrolling the indication of the camera magnification on the scrollable UI to match the identified specific camera magnification includes adjusting the camera magnification by using the calculated scroll speed.

* * * * *